(12) United States Patent
Davis et al.

(10) Patent No.: US 9,830,588 B2
(45) Date of Patent: Nov. 28, 2017

(54) METHODS AND ARRANGEMENTS FOR SMARTPHONE PAYMENTS

(71) Applicant: Digimarc Corporation, Beaverton, OR (US)

(72) Inventors: Bruce L. Davis, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 13/873,117

(22) Filed: Apr. 29, 2013

(65) Prior Publication Data
US 2014/0244495 A1 Aug. 28, 2014

Related U.S. Application Data

(63) Continuation-in-part of application No. 13/792,764, filed on Mar. 11, 2013, now abandoned.

(60) Provisional application No. 61/769,701, filed on Feb. 26, 2013.

(51) Int. Cl.
*G06Q 20/22* (2012.01)
*G06Q 20/32* (2012.01)
*G06Q 20/34* (2012.01)

(52) U.S. Cl.
CPC ......... *G06Q 20/227* (2013.01); *G06Q 20/327* (2013.01); *G06Q 20/351* (2013.01)

(58) Field of Classification Search
None
See application file for complete search history.

(56) References Cited

U.S. PATENT DOCUMENTS

| | | | | |
|---|---|---|---|---|
| 4,800,543 A | * | 1/1989 | Lyndon-James et al. | 368/10 |
| 4,926,480 A | * | 5/1990 | Chaum | 705/69 |
| 5,276,311 A | * | 1/1994 | Hennige | 235/380 |

(Continued)

FOREIGN PATENT DOCUMENTS

WO WO2014134180 9/2014

OTHER PUBLICATIONS

Efrati, A., & Troianovski, A., "War over the digital wallet—google, verizon wireless spar in race to build mobile-payment services," Dec. 7, 2011, Wall Street Journal, p. 5-6.*

(Continued)

*Primary Examiner* — Ryan D Donlon
*Assistant Examiner* — Garrison Prinslow
(74) *Attorney, Agent, or Firm* — Digimarc Corporation

(57) ABSTRACT

To make a payment, a smartphone presents artwork for a payment card (e.g., a Visa card) that has been selected by a user from a virtual wallet of such cards. Encoded in the displayed artwork is payment information that has been encrypted with a context-dependent session key. A cooperating system (e.g., a retailer's point of sale system) uses a camera to capture an image of the artwork, and independently creates the session key from its own context sensor (s), enabling decryption of the payment information. Such technology provides a superior transaction security model at a fraction of the cost of competing chip card payment systems (which require, e.g., expensive physical cards, and single-purpose reader hardware). A great variety of other features and arrangements are also detailed.

8 Claims, 17 Drawing Sheets

(56) References Cited

U.S. PATENT DOCUMENTS

| | | | |
|---|---|---|---|
| 5,793,027 A * | 8/1998 | Baik | 235/380 |
| 6,014,648 A * | 1/2000 | Brennan | 705/41 |
| 6,122,403 A * | 9/2000 | Rhoads | 382/233 |
| 6,169,890 B1 * | 1/2001 | Vatanen | 455/406 |
| 6,230,267 B1 * | 5/2001 | Richards et al. | 713/172 |
| 6,311,171 B1 * | 10/2001 | Dent | 705/64 |
| 6,389,402 B1 * | 5/2002 | Ginter | G06F 21/10 348/E5.006 |
| 6,590,996 B1 * | 7/2003 | Reed et al. | 382/100 |
| 6,609,113 B1 * | 8/2003 | O'Leary et al. | 705/39 |
| 6,611,607 B1 * | 8/2003 | Davis et al. | 382/100 |
| 6,614,914 B1 * | 9/2003 | Rhoads et al. | 382/100 |
| 6,704,714 B1 * | 3/2004 | O'Leary et al. | 705/39 |
| 6,735,324 B1 * | 5/2004 | McKinley et al. | 382/100 |
| 6,957,776 B1 * | 10/2005 | Ng | 235/474 |
| 7,003,495 B1 * | 2/2006 | Burger et al. | 705/50 |
| 7,020,304 B2 * | 3/2006 | Alattar et al. | 382/100 |
| 7,043,048 B1 * | 5/2006 | Ellingson | 382/100 |
| 7,123,740 B2 * | 10/2006 | McKinley | 382/100 |
| 7,159,116 B2 * | 1/2007 | Moskowitz | G06F 21/10 380/231 |
| 7,191,156 B1 * | 3/2007 | Seder | 705/64 |
| 7,197,164 B2 * | 3/2007 | Levy | 382/100 |
| 7,503,488 B2 | 3/2009 | Davis | |
| 7,508,954 B2 * | 3/2009 | Lev | 382/100 |
| 7,529,563 B1 * | 5/2009 | Pitroda | 455/558 |
| 7,587,601 B2 * | 9/2009 | Levy et al. | 713/176 |
| 7,743,980 B2 * | 6/2010 | de Sylva | 235/380 |
| 8,077,905 B2 * | 12/2011 | Rhoads | G06K 9/00577 356/601 |
| 8,103,877 B2 * | 1/2012 | Hannigan et al. | 713/176 |
| 8,116,685 B2 | 2/2012 | Bregman-Amitai et al. | |
| 8,250,660 B2 * | 8/2012 | Levy et al. | 726/26 |
| 8,294,569 B2 | 10/2012 | Thorn et al. | |
| 8,313,037 B1 * | 11/2012 | Humphrey | 235/493 |
| 8,376,239 B1 * | 2/2013 | Humphrey | 235/493 |
| 8,380,177 B2 * | 2/2013 | Laracey | G06Q 30/0253 370/259 |
| 8,396,810 B1 * | 3/2013 | Cook | 705/67 |
| 8,412,577 B2 * | 4/2013 | Rodriguez | 705/14.58 |
| 8,423,457 B1 * | 4/2013 | Schattauer et al. | 705/39 |
| 8,429,407 B2 | 4/2013 | Os et al. | |
| 8,498,627 B2 | 7/2013 | Rodriguez | |
| 8,548,810 B2 * | 10/2013 | Rodriguez | 704/273 |
| 8,620,790 B2 | 12/2013 | Priebatsch | |
| 8,631,230 B2 | 1/2014 | Manges | |
| 8,639,619 B1 | 1/2014 | Priebatsch | |
| 8,694,438 B1 | 4/2014 | Jernigan et al. | |
| 8,971,567 B2 * | 3/2015 | Reed et al. | 382/100 |
| 2001/0037312 A1 * | 11/2001 | Gray et al. | 705/67 |
| 2002/0004783 A1 * | 1/2002 | Paltenghe et al. | 705/41 |
| 2002/0010684 A1 * | 1/2002 | Moskowitz | G06F 21/10 705/75 |
| 2002/0038287 A1 * | 3/2002 | Villaret et al. | 705/41 |
| 2002/0077978 A1 * | 6/2002 | O'Leary et al. | 705/40 |
| 2002/0077993 A1 * | 6/2002 | Immonen et al. | 705/77 |
| 2003/0097444 A1 * | 5/2003 | Dutta et al. | 709/225 |
| 2003/0140004 A1 * | 7/2003 | O'Leary et al. | 705/39 |
| 2005/0018883 A1 * | 1/2005 | Scott | 382/115 |
| 2005/0049964 A1 * | 3/2005 | Winterer et al. | 705/39 |
| 2005/0071179 A1 * | 3/2005 | Peters et al. | 705/1 |
| 2005/0116026 A1 * | 6/2005 | Burger | G06F 21/6218 235/380 |
| 2006/0157559 A1 * | 7/2006 | Levy et al. | 235/380 |
| 2006/0253335 A1 * | 11/2006 | Keena et al. | 705/26 |
| 2007/0109266 A1 * | 5/2007 | Davis et al. | 345/163 |
| 2007/0150411 A1 * | 6/2007 | Addepalli | G06Q 20/10 705/39 |
| 2007/0162761 A1 * | 7/2007 | Davis et al. | 713/182 |
| 2007/0168332 A1 * | 7/2007 | Bussard et al. | 707/3 |
| 2007/0174613 A1 | 7/2007 | Paddon et al. | |
| 2007/0187505 A1 * | 8/2007 | Rhoads | G06K 9/00577 235/454 |
| 2007/0282739 A1 * | 12/2007 | Thomsen | 705/39 |
| 2008/0041936 A1 * | 2/2008 | Vawter | 235/380 |
| 2008/0041937 A1 * | 2/2008 | Vawter | 235/380 |
| 2008/0048022 A1 * | 2/2008 | Vawter | 235/380 |
| 2008/0091602 A1 * | 4/2008 | Gray et al. | 705/44 |
| 2009/0037326 A1 * | 2/2009 | Chitti | G06Q 20/10 705/39 |
| 2009/0043658 A1 * | 2/2009 | Webb et al. | 705/14 |
| 2009/0085873 A1 * | 4/2009 | Betts | G08B 13/1427 345/169 |
| 2009/0104888 A1 * | 4/2009 | Cox | 455/410 |
| 2009/0144161 A1 * | 6/2009 | Fisher | 705/16 |
| 2009/0198615 A1 * | 8/2009 | Emerson et al. | 705/44 |
| 2009/0307132 A1 * | 12/2009 | Phillips | G06Q 20/105 705/41 |
| 2010/0048242 A1 * | 2/2010 | Rhoads et al. | 455/556.1 |
| 2010/0057552 A1 * | 3/2010 | O'Leary et al. | 705/14.27 |
| 2010/0076833 A1 * | 3/2010 | Nelsen | 705/14.25 |
| 2010/0077017 A1 * | 3/2010 | Martinez | H04L 67/18 709/201 |
| 2010/0082444 A1 * | 4/2010 | Lin | G06Q 20/042 705/17 |
| 2010/0088188 A1 * | 4/2010 | Kumar | G06Q 20/10 705/17 |
| 2010/0088237 A1 * | 4/2010 | Wankmueller | 705/75 |
| 2010/0114731 A1 * | 5/2010 | Kingston et al. | 705/26 |
| 2010/0125495 A1 * | 5/2010 | Smith | G06Q 20/3223 705/14.23 |
| 2010/0138344 A1 * | 6/2010 | Wong | G06Q 20/10 705/44 |
| 2010/0150434 A1 * | 6/2010 | Reed | 382/162 |
| 2010/0179859 A1 * | 7/2010 | Davis et al. | 705/10 |
| 2010/0223152 A1 * | 9/2010 | Emerson et al. | 705/26 |
| 2010/0250436 A1 * | 9/2010 | Loevenguth et al. | 705/44 |
| 2010/0306113 A1 * | 12/2010 | Gray et al. | 705/76 |
| 2011/0035662 A1 * | 2/2011 | King | G06F 17/211 715/273 |
| 2011/0076942 A1 | 3/2011 | Taveau et al. | |
| 2011/0098056 A1 * | 4/2011 | Rhoads et al. | 455/456.1 |
| 2011/0105022 A1 * | 5/2011 | Vawter | 455/41.1 |
| 2011/0119156 A1 * | 5/2011 | Hwang et al. | 705/26.41 |
| 2011/0141276 A1 * | 6/2011 | Borghei | H04W 12/08 348/143 |
| 2011/0161076 A1 * | 6/2011 | Davis et al. | 704/231 |
| 2011/0161086 A1 * | 6/2011 | Rodriguez | 704/270 |
| 2011/0176706 A1 | 7/2011 | Levy | |
| 2011/0180598 A1 * | 7/2011 | Morgan et al. | 235/380 |
| 2011/0187652 A1 | 8/2011 | Huibers | |
| 2011/0191438 A1 | 8/2011 | Huibers et al. | |
| 2011/0191823 A1 | 8/2011 | Huibers | |
| 2011/0208652 A1 * | 8/2011 | O'Leary et al. | 705/40 |
| 2011/0208656 A1 * | 8/2011 | Alba et al. | 705/65 |
| 2011/0212717 A1 * | 9/2011 | Rhoads et al. | 455/420 |
| 2011/0238571 A1 * | 9/2011 | O'Leary et al. | 705/41 |
| 2011/0246362 A1 * | 10/2011 | O'Leary et al. | 705/41 |
| 2011/0251892 A1 * | 10/2011 | Laracey | G06Q 30/0253 705/14.51 |
| 2011/0258121 A1 * | 10/2011 | Kauniskangas | G06Q 20/20 705/67 |
| 2011/0274310 A1 * | 11/2011 | Rhoads | 382/100 |
| 2011/0276474 A1 * | 11/2011 | Portillo et al. | 705/39 |
| 2011/0289224 A1 | 11/2011 | Trott | |
| 2011/0293094 A1 | 12/2011 | Os et al. | |
| 2011/0295502 A1 | 12/2011 | Faenger | |
| 2011/0314549 A1 * | 12/2011 | Song et al. | 726/25 |
| 2011/0320314 A1 * | 12/2011 | Brown | 705/26.41 |
| 2012/0011063 A1 * | 1/2012 | Killian | G06Q 20/105 705/41 |
| 2012/0022958 A1 * | 1/2012 | de Sylva | 705/24 |
| 2012/0024945 A1 * | 2/2012 | Jones | 235/379 |
| 2012/0046071 A1 * | 2/2012 | Brandis et al. | 455/556.1 |
| 2012/0095865 A1 * | 4/2012 | Doherty et al. | 705/26.8 |
| 2012/0143752 A1 * | 6/2012 | Wong et al. | 705/41 |
| 2012/0150601 A1 * | 6/2012 | Fisher | 705/14.23 |
| 2012/0166333 A1 * | 6/2012 | von Behren et al. | 705/41 |
| 2012/0166810 A1 * | 6/2012 | Tao et al. | 713/186 |
| 2012/0197794 A1 * | 8/2012 | Grigg et al. | 705/41 |
| 2012/0209688 A1 * | 8/2012 | Lamothe et al. | 705/14.27 |

(56) References Cited

U.S. PATENT DOCUMENTS

| | | | | |
|---|---|---|---|---|
| 2012/0209749 A1* | 8/2012 | Hammad | G06Q 30/06 | 705/27.1 |
| 2012/0232968 A1* | 9/2012 | Calman et al. | | 705/14.4 |
| 2012/0246079 A1* | 9/2012 | Wilson | H04L 63/0807 | 705/67 |
| 2012/0271712 A1* | 10/2012 | Katzin et al. | | 705/14.51 |
| 2012/0278155 A1* | 11/2012 | Faith | G06Q 20/40145 | 705/14.26 |
| 2012/0278241 A1* | 11/2012 | Brown et al. | | 705/67 |
| 2012/0284012 A1* | 11/2012 | Rodriguez et al. | | 704/1 |
| 2012/0286928 A1* | 11/2012 | Mullen et al. | | 340/5.61 |
| 2012/0290376 A1* | 11/2012 | Dryer et al. | | 705/14.23 |
| 2012/0290449 A1* | 11/2012 | Mullen | G06Q 10/00 | 705/27.2 |
| 2012/0296741 A1* | 11/2012 | Dykes | | 705/14.53 |
| 2012/0303425 A1 | 11/2012 | Katzin | | |
| 2012/0310760 A1* | 12/2012 | Phillips et al. | | 705/26.1 |
| 2012/0310826 A1* | 12/2012 | Chatterjee | G06Q 20/36 | 705/41 |
| 2012/0310836 A1* | 12/2012 | Eden | G06Q 20/04 | 705/44 |
| 2012/0323717 A1* | 12/2012 | Kirsch | G06Q 20/0855 | 705/26.1 |
| 2013/0008947 A1* | 1/2013 | Aidasani et al. | | 235/375 |
| 2013/0024371 A1* | 1/2013 | Hariramani et al. | | 705/41 |
| 2013/0036048 A1* | 2/2013 | Campos et al. | | 705/41 |
| 2013/0041830 A1* | 2/2013 | Singh et al. | | 705/65 |
| 2013/0054454 A1* | 2/2013 | Purves et al. | | 705/41 |
| 2013/0054470 A1* | 2/2013 | Campos et al. | | 705/67 |
| 2013/0060665 A1* | 3/2013 | Davis et al. | | 705/30 |
| 2013/0060686 A1* | 3/2013 | Mersky | | 705/41 |
| 2013/0073373 A1* | 3/2013 | Fisher | | 705/14.38 |
| 2013/0080230 A1* | 3/2013 | Fisher | | 705/14.23 |
| 2013/0080231 A1* | 3/2013 | Fisher | | 705/14.23 |
| 2013/0080232 A1* | 3/2013 | Fisher | | 705/14.23 |
| 2013/0080233 A1* | 3/2013 | Fisher | | 705/14.23 |
| 2013/0080240 A1* | 3/2013 | Fisher | | 705/14.38 |
| 2013/0085877 A1* | 4/2013 | Ruhrig | | 705/21 |
| 2013/0085941 A1* | 4/2013 | Rosenblatt et al. | | 705/44 |
| 2013/0091042 A1* | 4/2013 | Shah et al. | | 705/35 |
| 2013/0097078 A1* | 4/2013 | Wong et al. | | 705/44 |
| 2013/0103482 A1* | 4/2013 | Song et al. | | 705/14.26 |
| 2013/0126607 A1* | 5/2013 | Behjat | | 235/380 |
| 2013/0146661 A1* | 6/2013 | Melbrod et al. | | 235/435 |
| 2013/0159154 A1* | 6/2013 | Purves et al. | | 705/35 |
| 2013/0159178 A1* | 6/2013 | Colon et al. | | 705/41 |
| 2013/0166332 A1* | 6/2013 | Hammad | | 705/5 |
| 2013/0173477 A1* | 7/2013 | Cairns | | 705/76 |
| 2013/0179340 A1* | 7/2013 | Alba et al. | | 705/41 |
| 2013/0179341 A1* | 7/2013 | Boudreau | | 705/41 |
| 2013/0212012 A1* | 8/2013 | Doherty et al. | | 705/40 |
| 2013/0218765 A1* | 8/2013 | Hammad et al. | | 705/41 |
| 2013/0223673 A1* | 8/2013 | Davis et al. | | 382/100 |
| 2013/0228616 A1 | 9/2013 | Bhosle et al. | | |
| 2013/0238455 A1* | 9/2013 | Laracey | G06Q 20/108 | 705/21 |
| 2013/0254028 A1* | 9/2013 | Salci | | 705/14.53 |
| 2013/0256421 A1* | 10/2013 | Johnson et al. | | 235/494 |
| 2013/0282438 A1* | 10/2013 | Hunter | G01S 1/02 | 705/7.32 |
| 2013/0290106 A1* | 10/2013 | Bradley | G06Q 90/20 | 705/14.64 |
| 2013/0290379 A1* | 10/2013 | Rhoads et al. | | 707/803 |
| 2013/0295878 A1* | 11/2013 | Davis | | 455/406 |
| 2013/0311329 A1* | 11/2013 | Knudson et al. | | 705/26.9 |
| 2013/0325567 A1* | 12/2013 | Bradley et al. | | 705/14.1 |
| 2013/0334308 A1* | 12/2013 | Priebatsch | | 235/383 |
| 2013/0346305 A1* | 12/2013 | Mendes | | 705/41 |
| 2014/0058936 A1* | 2/2014 | Ren et al. | | 705/41 |
| 2014/0074704 A1* | 3/2014 | White et al. | | 705/41 |
| 2014/0086590 A1* | 3/2014 | Ganick | G06Q 30/02 | 398/118 |
| 2014/0089672 A1* | 3/2014 | Luna | H04L 9/3231 | 713/186 |
| 2014/0100973 A1* | 4/2014 | Brown | G06Q 20/34 | 705/17 |
| 2014/0108020 A1* | 4/2014 | Sharma et al. | | 704/500 |
| 2014/0123253 A1* | 5/2014 | Davis | G06F 21/316 | 726/6 |
| 2014/0280316 A1* | 9/2014 | Ganick | G06F 17/30522 | 707/769 |
| 2014/0369169 A1* | 12/2014 | Iida | H04B 11/00 | 367/135 |

OTHER PUBLICATIONS

Whiteside, J., & Decourcy, C., "The wallet of the future," Oct. 2012, Michigan Banker, 24(9), 21-23, p. 5-7.*

Karen, C. K., "Digitize your wallet," Oct. 2012, Information Today, 29(9), 21, p. 5-7.*

Wolfe, D., "Visa's digital wallet, V.me, launches with PNC," Oct. 16, 2012, American Banker, p. 5-6.*

Johnson, A. R., "Carriers to debut mobile-payments service isis next week," Oct. 17, 2012, Wall Street Journal (Online), p. 5-6.*

ComScore, "comScore study highlights digital wallet market potential and current adoption barriers," Feb. 4, 2013, PR Newswire, p. 5-7.*

Halevi, Tzipora et al., "Secure Proximity Detection for NFC Devices Based on Ambient Sensor Data", 2012, ESORICS 2012, LNCS 7459, pp. 379-396.*

Bichler et al, Key generation based on acceleration data of shaking processes, UbiComp 2007, LNCS vol. 4717, pp. 304-317.

Gartner Says the Use of Mobile Fraud Detection in Mobile Commerce Environments is Imperative, Press Release, Sep. 20, 2010.

Kunze, et al, Symbolic object localization through active sampling of acceleration and sound signatures, Proc. of 9th Int'l Conf on Ubiquitous Computing, 2007, pp. 163-180.

Malek, et al, A Framework for Context-Aware Authentication, 2008 IET 4th Int'l Conf on Intelligent Environments, 2008, pp. 1-8.

Mathur, et al, ProxiMate—Proximity-based Secure Pairing Using Ambient Wireless Signals, Proc 9th Int'l Conf on Mobile Systems, Applications, and Services, Jun. 2011, pp. 211-224.

Mayrhofer, A Context Authentication Proxy for IPSec Using Spatial Reference, Int'l Workshop on Trustworthy Computing, 2006, pp. 449-462.

Mayrhofer, et al, Shake well before use—Intuitive and secure pairing of mobile devices, IEEE Trans. on Mobile Computing, vol. 8, No. 6, Jun. 2009, pp. 792-806.

Mayrhofer, et al, Using a Spatial Context Authentication Proxy for Establishing Secure Wireless Communications, J. of Mobile Multimedia, 2006, pp. 198-217.

Mayrhofer, Spontaneous mobile device authentication based on sensor data, Information Security Technical Report 13, 2008, pp. 136-150.

Mayrhofer, The candidate key protocol for generating secret shared keys from similar sensor data streams, Security and Privacy in Ad-hoc and Sensor Networks, 2007, pp. 1-15.

Schurmann, Secure communication based on ambient audio, IEEE Trans on Mobile Computing, 2011.

Scott, et al, Audio location—Accurate low-cost location sensing, Pervasive 2005. LNCS, vol. 3468, 2005, pp. 307-311.

Sigg, Context-based security—State of the art, open research topics and a case study, 5th ACM Int'l Workshop on Context-Awareness for Self-Managing Systems, Sep. 17, 2011.

Sigg, Entropy of Audio Fingerprints for Unobtrusive Device Authentication, Proc. of the 7th Int'l and Interdisciplinary Conference on Modeling and Using Context, Sep. 26, 2011, pp. 296-299.

International Search Report and Written Opinion dated Oct. 28, 2014 from PCT/US14/18715 (corresponding to WO2014134180).

MasterCard Introduces MasterPass—The Future of Digital Payments, Press Release, Feb. 25, 2013.

* cited by examiner

```
Dave's Killer Bread          2.79
Chicken of the Sea Tuna      2.99
Fage Greek Yogurt             .69
Ponzi Pinot Gris            13.99
Oscar Meyer Bacon            4.47
    Rewards discount     -.99
Quaker Oats                  1.99
Red Bull 4-pack              7.67
Meyer Lemons (40.49 ea)      1.96
Delicata Squash (.79/lb)     3.42
```

FIG. 12A

```
Chicken of the Sea Tuna      2.99
Dave's Killer Bread          2.79
Delicata Squash (.79/lb)     3.42
Fage Greek Yogurt             .69
Meyer Lemons (40.49 ea)      1.96
Oscar Meyer Bacon            4.47
    Rewards discount     -.99
Ponzi Pinot Gris            13.99
Quaker Oats                  1.99
Red Bull 4-pack              7.67
```

FIG. 12B

```
Ponzi Pinot Gris            13.99
Red Bull 4-pack              7.67
Oscar Meyer Bacon            4.47
    Rewards discount     -.99
Delicata Squash (.79/lb)     3.42
Chicken of the Sea Tuna      2.99
Dave's Killer Bread          2.79
Quaker Oats                  1.99
Meyer Lemons (40.49 ea)      1.96
Fage Greek Yogurt             .69
```

FIG. 12C

```
LISTED
Chicken of the Sea Tuna      2.99
Delicata Squash (.79/lb)     3.42
Fage Greek Yogurt             .69
Meyer Lemons (40.49 ea)      1.96
Ponzi Pinot Gris            13.99
Quaker Oats                  1.99

MISSING
Newman's Marinara

OTHER
Dave's Killer Bread          2.79
Oscar Meyer Bacon            4.47
    Rewards discount     -.99
Red Bull 4-pack              7.67
```

FIG. 12D

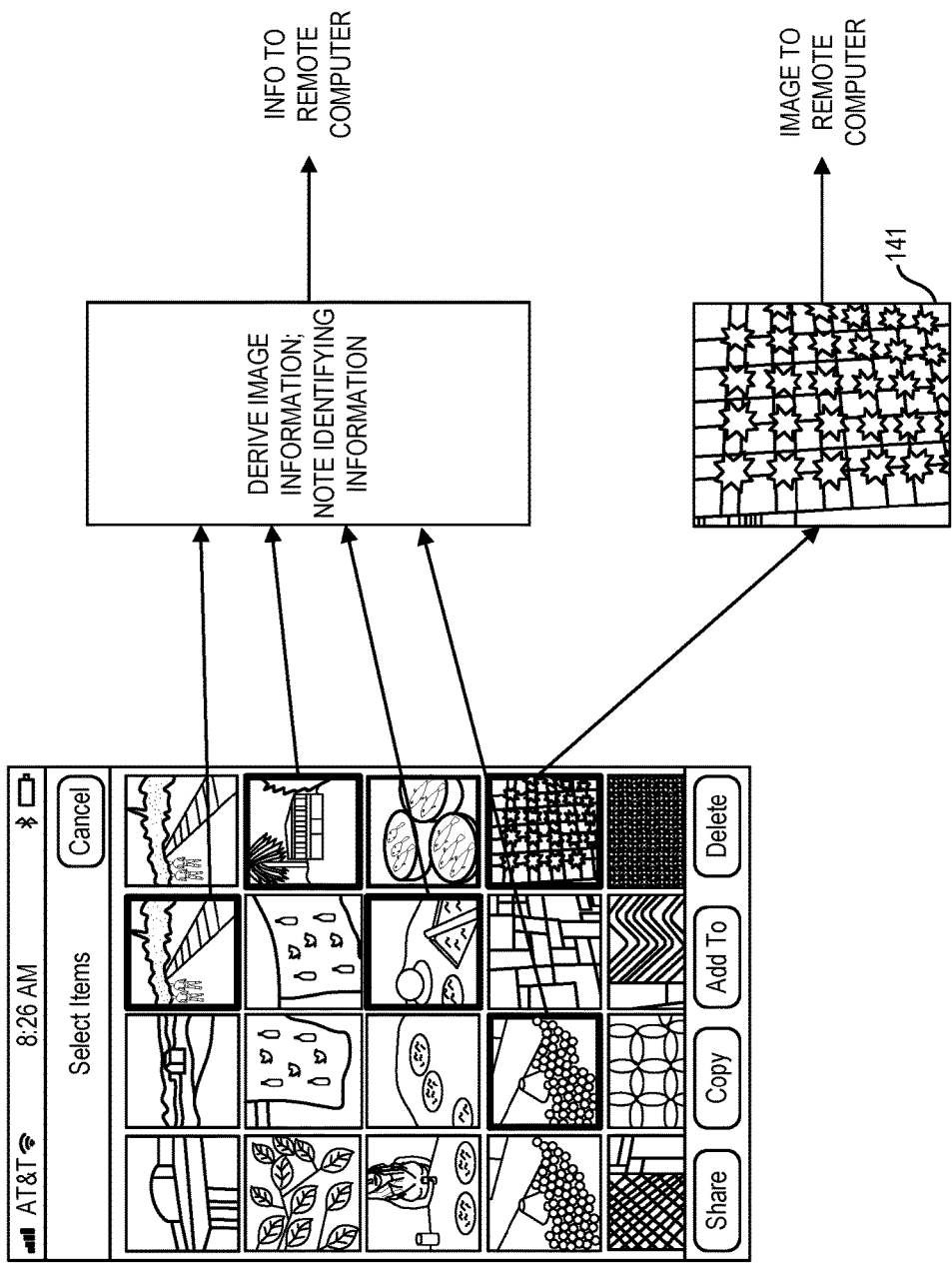

METHODS AND ARRANGEMENTS FOR SMARTPHONE PAYMENTS

RELATED APPLICATION DATA

This application is a continuation-in-part of application Ser. No. 13/792,764, filed Mar. 11, 2013, published as US 2014-0244494 A1, which claims priority benefit to provisional application 61/769,701, filed Feb. 26, 2013.

TECHNICAL FIELD

The present technology concerns, e.g., portable devices such as smartphones, and their use in making secure payments.

BACKGROUND AND INTRODUCTION TO THE TECHNOLOGY

Desirably, shoppers should be able to select from among plural different credit cards when making purchases, and not be tied to a single payment service. Having a variety of credit card payment options provides a variety of advantages.

For example, some credit card providers offer promotions that make spending on one card more attractive than another (e.g., double-miles on your Alaska Airlines Visa card for gas and grocery purchases made during February). Other promotions sometime include a lump-sum award of miles for new account holders after a threshold charge total has been reached (e.g., get 50,000 miles on your new CapitalOne Visa card after you've made $5,000 of purchases within the first five months). At still other times, a shopper may be working to accumulate purchases on one particular card in order to reach a desired reward level (e.g., reaching 50,000 miles to qualify for a Delta ticket to Europe).

The ability to easily select a desired card from among an assortment of cards is a feature lacking in many existing mobile payment systems. The legacy physical cards that embody the service provider brands and their capabilities are expensive to produce and have security weaknesses that can be mitigated in mobile payment systems. The look, feel, and user interfaces for physical cards are familiar and well understood. Existing mobile payments solutions involve numerous changes and new learning to operate.

In accordance with one aspect of the present technology, a smartphone user interface presents a wallet of virtual credit cards from which a user can pick when making a purchase. Data is conveyed optically from the phone to a cooperating system, such as a point of sale terminal or another smartphone. Preferably, the phone containing the virtual cards presents a graphical illustration of the selected card on the screen. Hidden in this graphical illustration (i.e., steganographically encoded) is transaction data. This transaction data provides information about the selected card, and also provides context data used to create a session key for security.

Through use of the present technology, merchants can obtain the digital security advantages associated with "chip card"-based payment systems, without investing in interface hardware that has no other use, using virtual cards that have no costs of manufacture and distribution. The technology is secure, easy, economical, and reliable.

The foregoing and other features and advantages of the present technology will be more readily apparent from the following detailed description, which proceeds with reference to the accompanying drawings.

BRIEF DESCRIPTION OF THE DRAWINGS

FIGS. 12A-12D show how checkout tallies can be customized per user preference.

FIGS. 14 and 15 show an authentication arrangement using photographs earlier captured by the user and stored on the smartphone.

DETAILED DESCRIPTION

The present technology has broad applicability, but necessarily is described by reference to a limited number of embodiments and applications. The reader should understand that this technology can be employed in various other forms—many quite different than the arrangements detailed in the following discussion.

One aspect of the present technology concerns payment technologies. A few particular embodiments are described below, from which various features and advantages will become apparent.

One particular method employs a user's portable device, such as a smartphone. As is familiar, such devices include a variety of components, e.g. a touch screen display, a processor, a memory, various sensor modules, etc.

Figure 1:
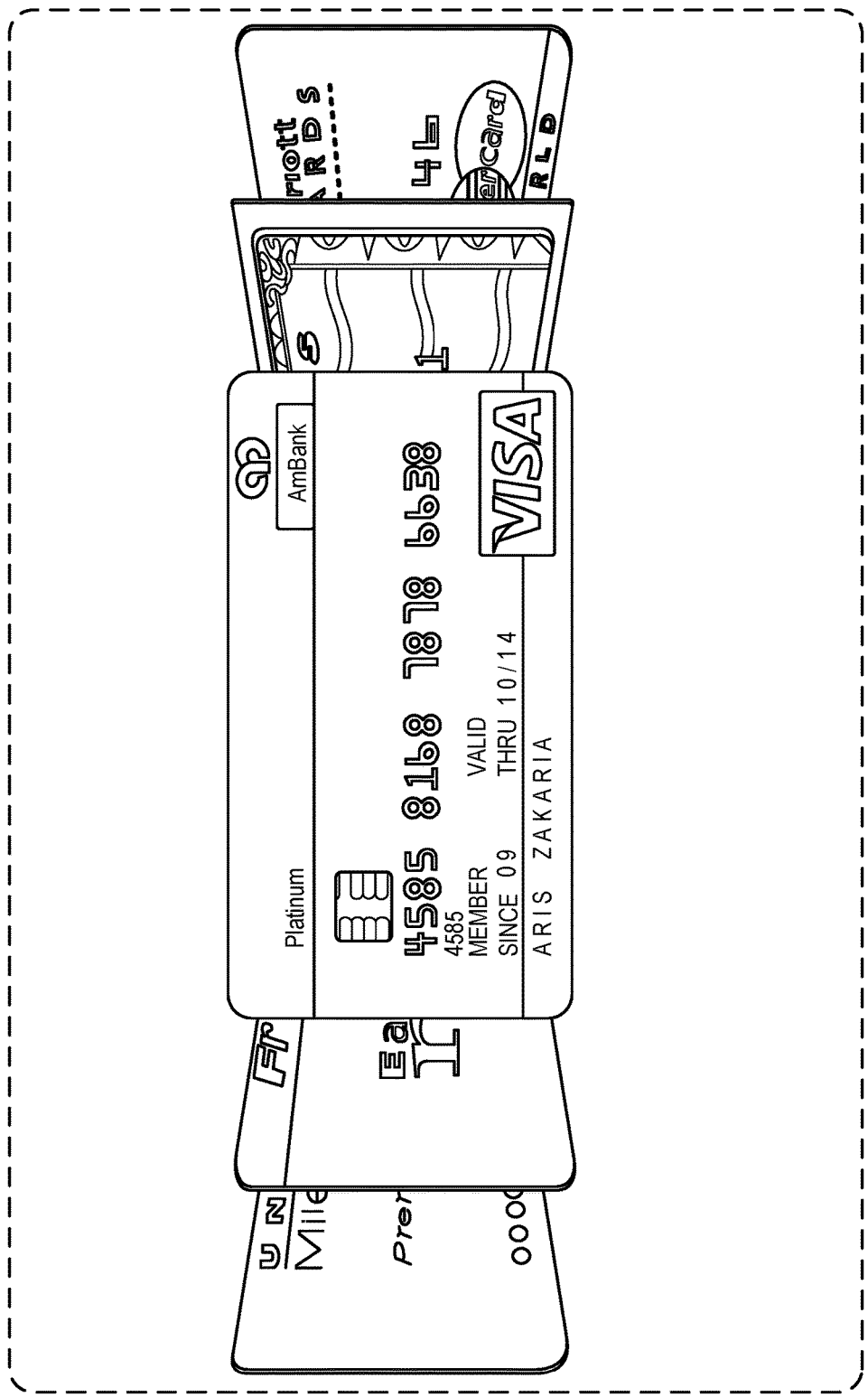
FIGS. 1 and 2 show a fliptych user interface used in certain embodiments to allow a user to select a desired card from a virtual wallet.

Stored in the memory is an electronic payment module comprising software instructions that cause the device to present a user interface (UI) on the display. One such user interface is shown in FIG. 1. The depicted user interface shows graphical representations of plural different cards of the sort typically carried in a user's wallet, e.g., credit cards, shopping loyalty cards, frequent flier membership cards, etc. ("wallet cards"). The software enables the user to scroll through the collection of cards and select one or more for use in a payment transaction, using a fliptych arrangement. (Fliptych is the generic name for the style of interface popularized by Apple under the name "Cover Flow.") As earlier noted, it is advantageous for a shopper to be able to choose different of the displayed payment cards at different times, and not be virtually tied to a single payment service.

Figure 2:
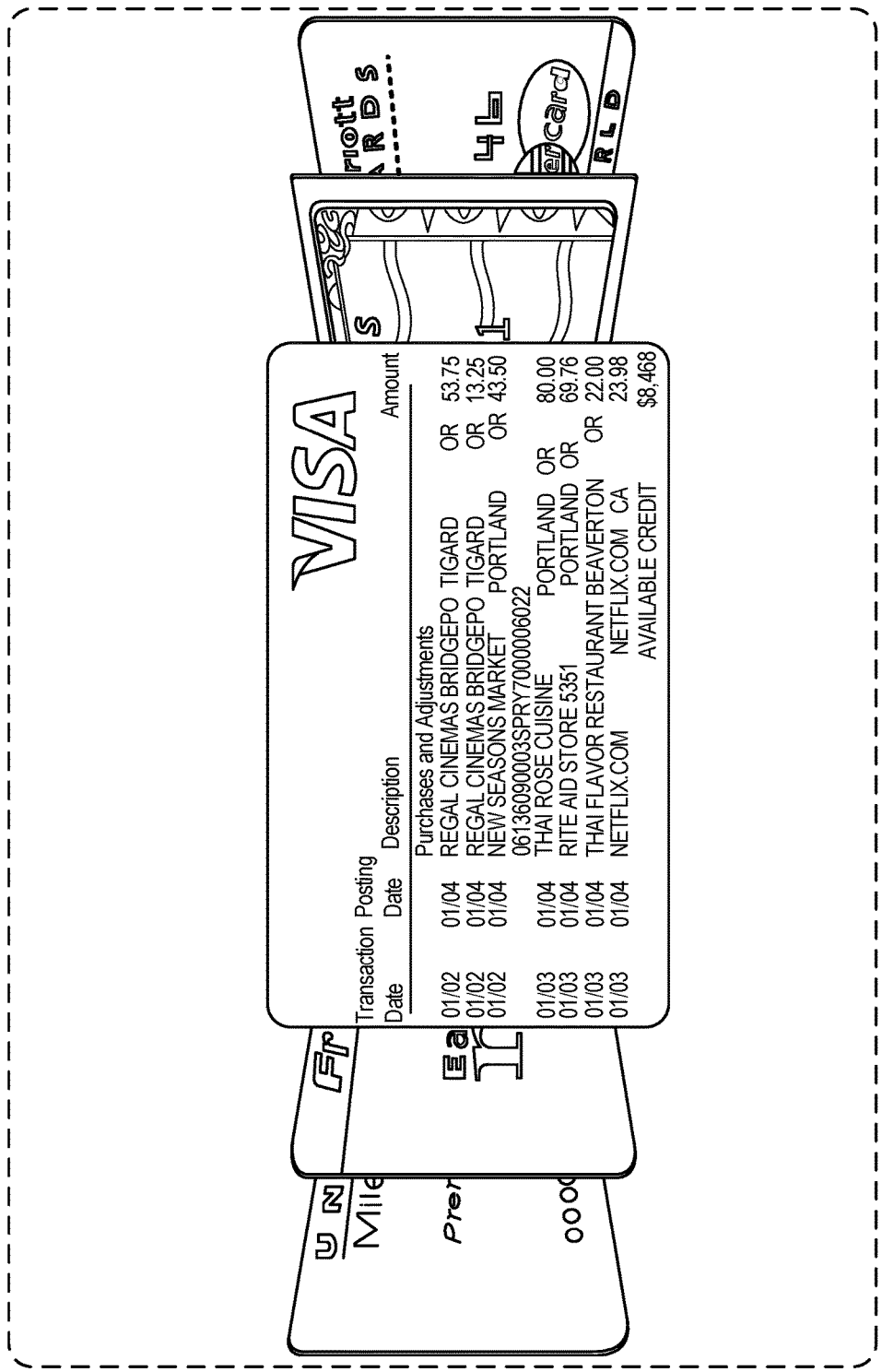

In the illustrated embodiment, after the user has scrolled to a desired card (a Visa card in FIG. 1), it is selected for use in the transaction by a user signal, such as a single-tap on the touch screen. (A double-tap causes the depicted card to virtually flip-over and reveal, on its back side, information about recent account usage and available credit, as depicted in FIG. 2.)

A great variety of other user interface styles can be used for selecting from a virtual wallet of cards. FIG. 3A shows another form of UI—a scrollable display of thumbnails. This UI illustrates that representations of cards other than faithful card depictions can be employed. (Note the logo, rather than the card image, to represent the MasterCard payment service).

Figure 3B:
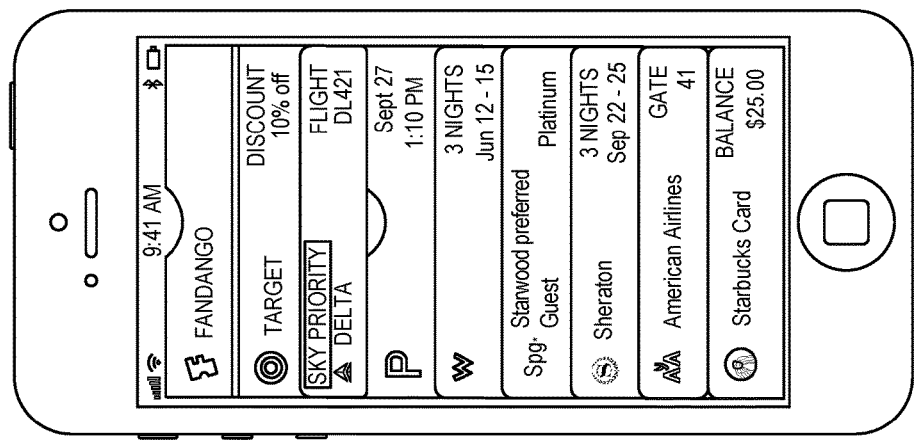
FIGS. 3A and 3B show alternative card selection user interfaces.
Figure 3A:
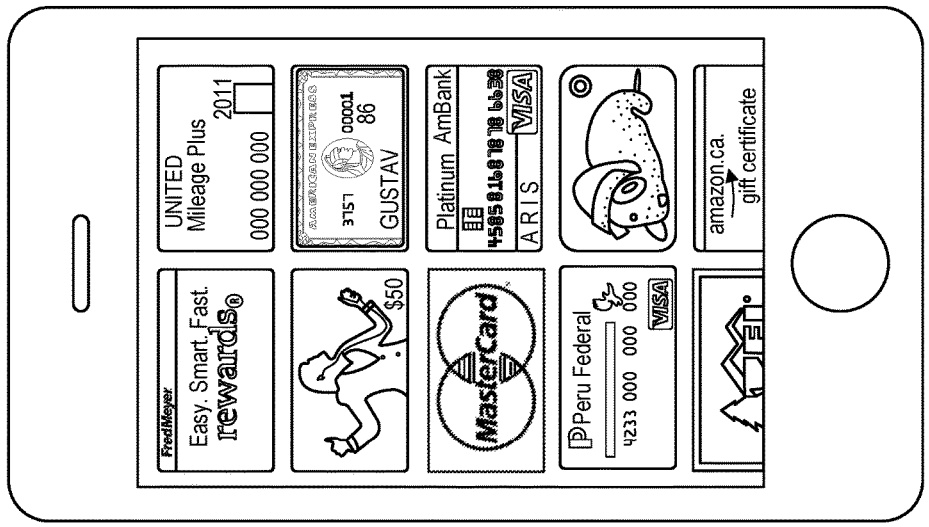

Still another alternative UI for card selection is that employed by Apple's Passbook software, shown in FIG. 3B. (The Passbook app is an organizer for passes such as movie tickets, plane and train boarding passes, gift cards, coupons, etc.)

After the user has selected a payment card, the device may perform a user security check—if required by the card issuer or by stored profile data configured by the user. One security check is entry of a PIN or password, although there are many others.

The illustrative transaction method further involves generating context-based authentication data using data from one or more smartphone sensors, as discussed more fully below. This authentication data serves to assure the cooperating system that the smartphone is legitimate and is not, e.g., a fraudulent "replay attack" of the system.

Figure 4A:
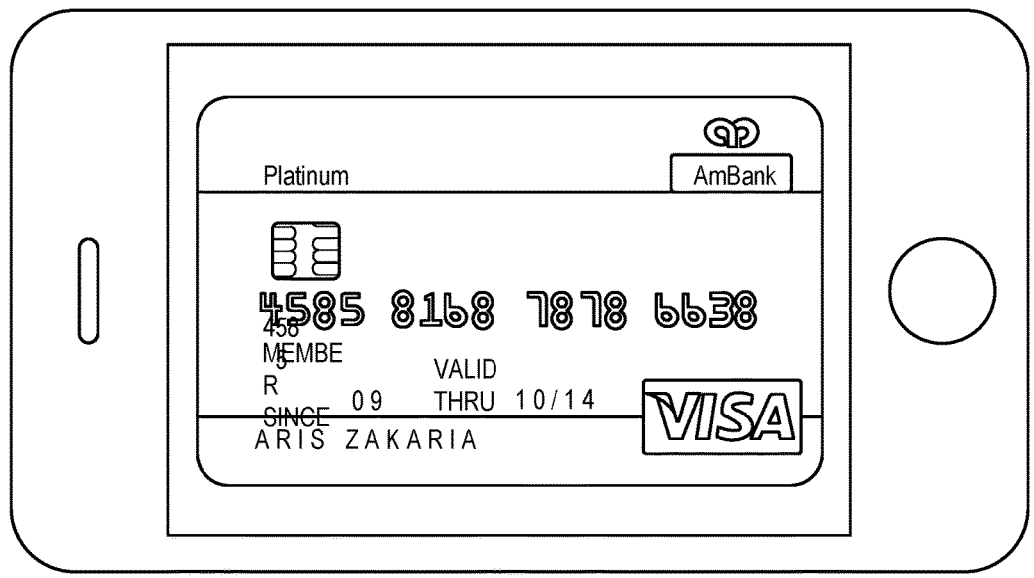
FIG. 4A shows artwork for a selected card, steganographically encoded with card and authentication information, displayed on a smartphone screen for optical sensing by a cooperating system.

After the security check (if any), and generation of the context-based authentication data, the smartphone displays corresponding artwork on its display, as shown in FIG. 4A. This artwork visually indicates the selected payment service, thereby permitting the user to quickly check that the correct payment card has been selected. The card number, a logo distinctive of the selected payment service (e.g., an American Express, Visa or MasterCard logo) and/or card issuer (e.g., US Bank, Bank of America) can be included in the artwork, for viewing by the user.

Figure 4B:
FIG. 4B is similar to FIG. 4A, but uses overt machine readable encoding (i.e., a barcode) instead of steganographic encoding, to optically convey information to the cooperating system.

While the smartphone display shown in FIG. 4A indicates the selected payment service, it also includes the payment service account data (e.g., account number, owner name, country code, and card expiration date), as well as the context-based authentication data. This information is not evident in the FIG. 4A artwork because it is hidden, using steganographic encoding (digital watermarking). However, such information can be decoded from the artwork by a corresponding (digital watermark) detector. Alternatively, such information can be conveyed otherwise, such as by other forms of machine-readable encoding (e.g., the barcode shown in FIG. 4B).

The user shows the artwork on the phone display to a sensor (e.g., a camera) of a cooperating system, such as a point of sale (POS) terminal, or a clerk's portable device, which captures one or more frames of imagery depicting the display. In one particular case the user holds the smartphone in front of a fixed camera, such as at a self-checkout terminal. In another, a POS terminal camera, or a smartphone camera, is positioned (e.g., by a checkout clerk) so as to capture an image of the smartphone screen. In still another, the user puts the smartphone, display facing up, on a conveyor of a grocery checkout, where it is imaged by the same camera(s) that is used to identify products for checkout. In all such arrangements, information is conveyed optically from the user device to the cooperating system. (Related technology is detailed in applicant's pending application Ser. No. 13/750,752, filed Jan. 25, 2013, which issued as U.S. Pat. No. 9,367,770).

Figure 5:
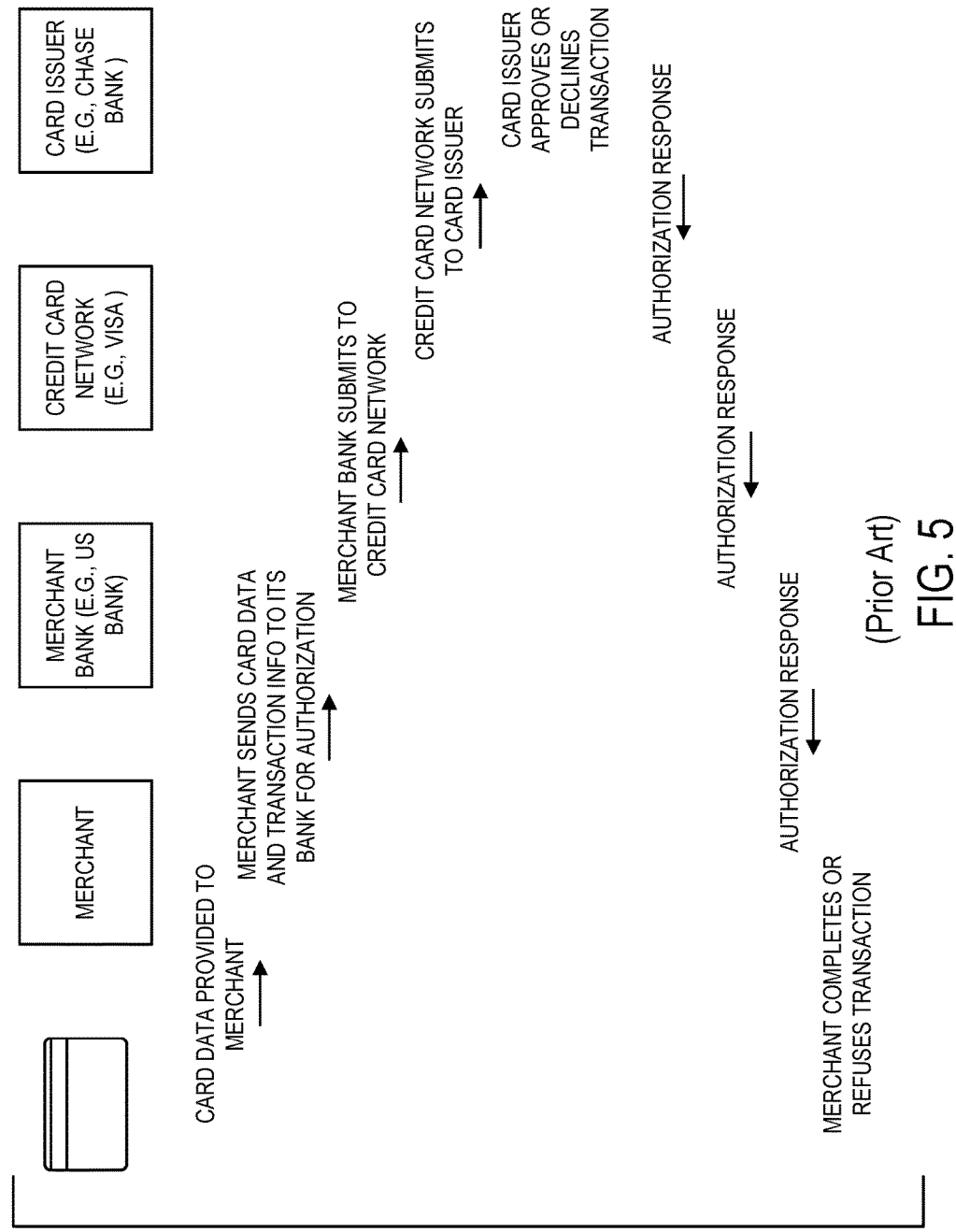
FIG. 5 illustrates a common type of credit card transaction processing.

The cooperating system decodes the account data and authentication data from the captured imagery. The transaction is next security-checked by use of the authentication data. Corresponding transaction information is then forwarded to the merchant's bank for processing. From this point on, the payment transaction may proceed in the conventional manner. (FIG. 5 illustrates a credit card approval process for a typical transaction.)

Figure 6:
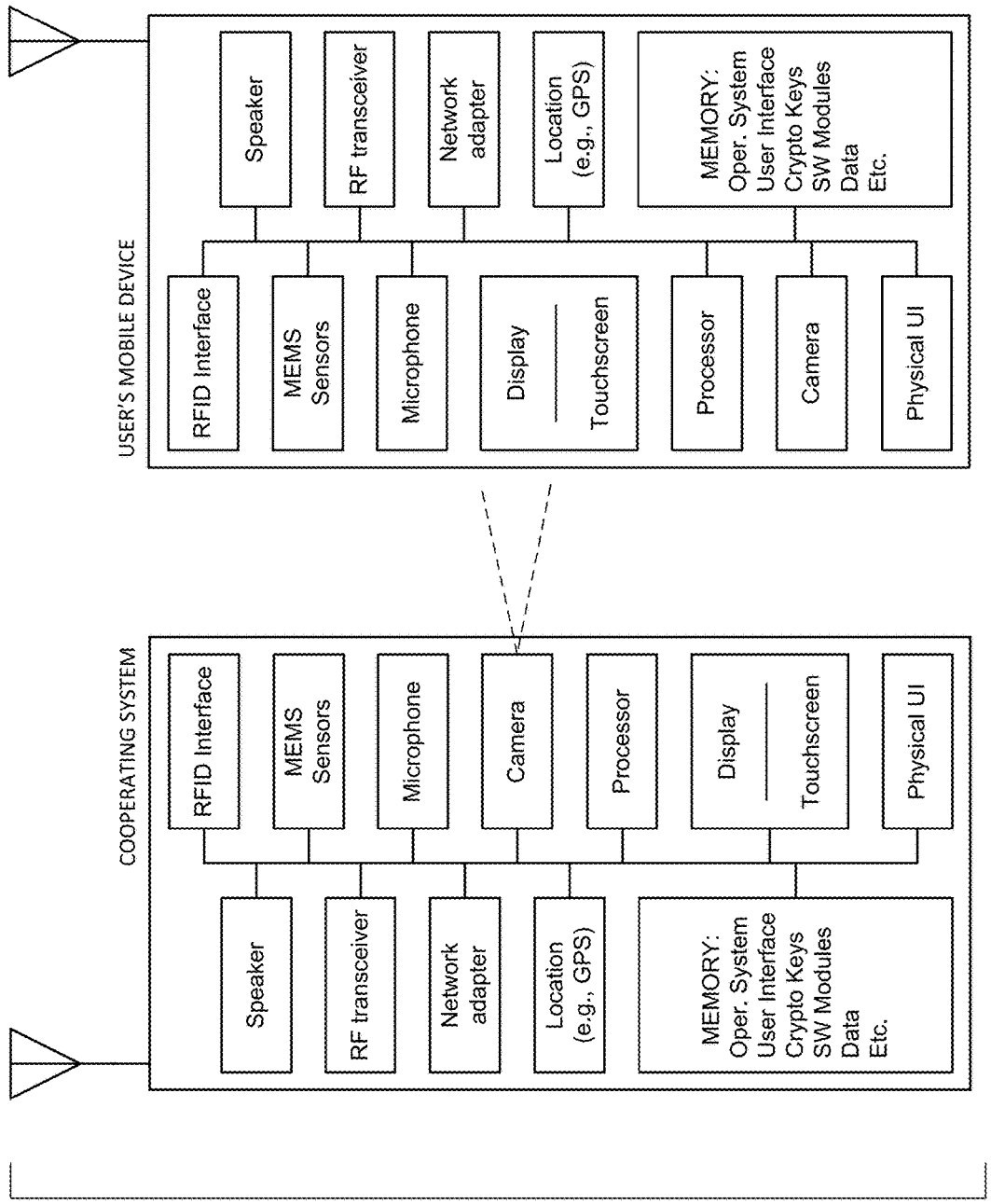
FIG. 6 shows a block diagram of a system in which a user's mobile device optically communicates with a cooperating system.

FIG. 6 shows some of the hardware elements involved in this embodiment, namely a user's smartphone, and a cooperating system. These elements are depicted as having identical components (which may be the case, e.g., if the cooperating system is another smartphone). The dashed lines illustrate that the camera of the cooperating system captures imagery from the display of the user smartphone.

Figure 7:
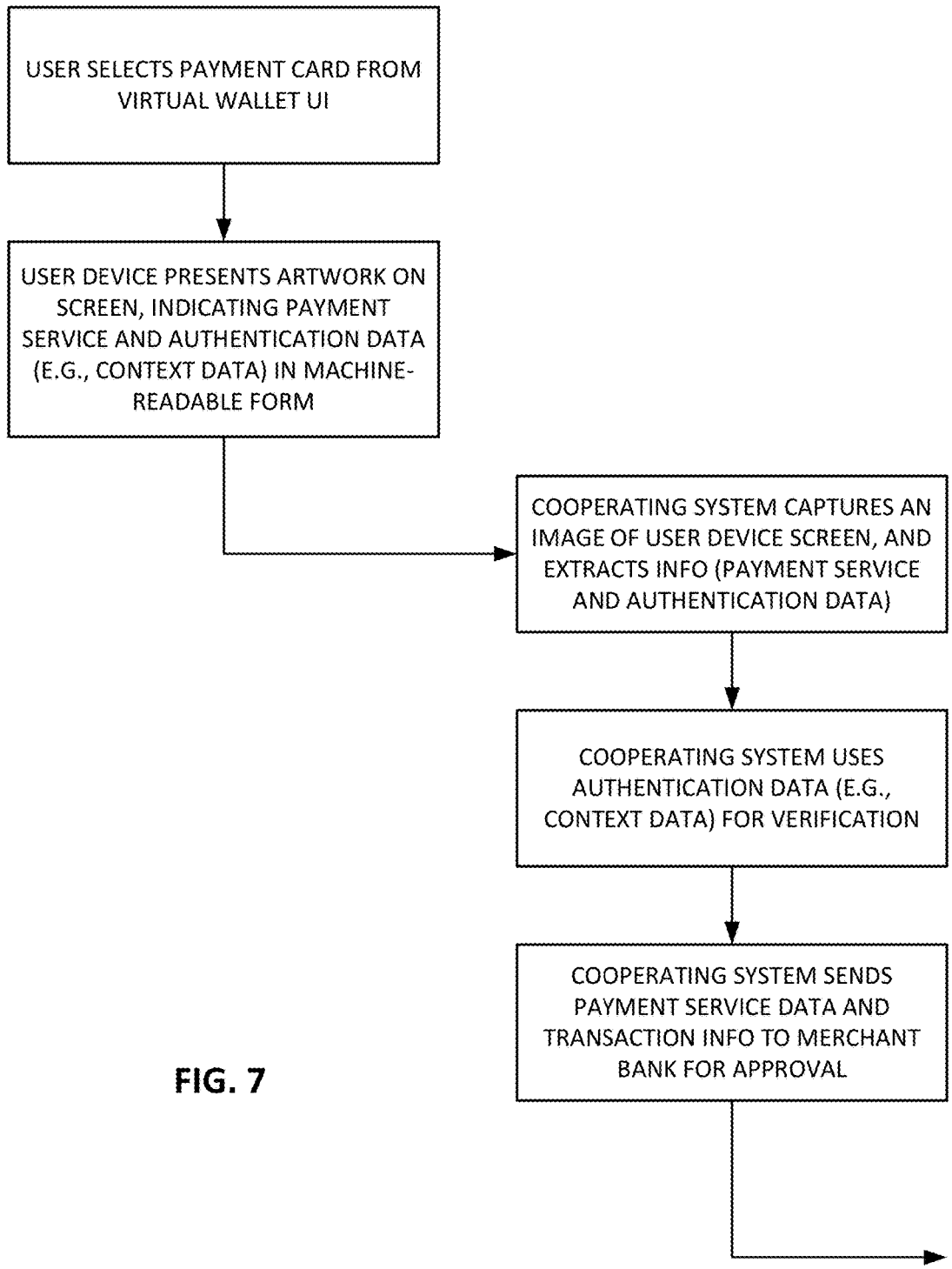
FIG. 7 is a flow chart detailing acts of an illustrative method.

FIG. 7 summarizes a few aspects of the above-described embodiment in flow chart form.

The authentication data used in the detailed embodiment can be of various types, and can serve various roles, as detailed in the following discussion.

A security vulnerability of many systems is the so-called "replay attack." In this scenario, a perpetrator collects data from a valid transaction, and later re-uses it to fraudulently make a second transaction. In the present case, if a perpetrator obtained imagery captured by a POS terminal, e.g., depicting the FIG. 4A virtual payment card of a user, then this same imagery might later be employed to mimic presentation of a valid payment card for any number of further transactions. (A simple case would be the perpetrator printing a captured image of the FIG. 4A screen display, and presenting the printed picture to a camera at a self-service checkout terminal to "pay" for merchandise.)

The authentication data of the present system defeats this type of attack. The authentication data is of a character that naturally changes from transaction to transaction. A simple example is time or date. If this information is encoded in the image, the cooperating system can check that the decoded information matches its own assessment of the time/date.

As sensors have proliferated in smartphones, a great variety of other authentication data can be employed. For example, some smartphones now include barometric pressure sensors. The barometric pressure currently sensed by the smartphone sensor can be among the data provided from the smartphone display to the cooperating system. The cooperating system can check a barometric sensor of its own, and confirm that the received information matches within some margin of error, e.g., 1 millibar. Temperature is another atmospheric parameter than can be used in this fashion.

Other authentication data concern the pose and/or motion of the smartphone. Smartphones are now conventionally equipped with a tri-axis magnetometer (compass), a tri-axis accelerometer and/or a tri-axis gyroscope. Data from these sensors allow the smartphone to characterize its position and motion, which information can be encoded in the displayed artwork. The cooperating system can analyze its captured imagery of the smartphone to make its own assessment of these data.

For example, in a supermarket context, a POS terminal may analyze camera data to determine that the shopper's camera is moving 1 foot per second (i.e., on a moving conveyor), and is in a pose with its screen facing straight up, with its top orientated towards a compass direction of 322 degrees. If the authentication data decoded from the artwork displayed on the camera screen does not match this pose/motion data observed by the POS terminal, then something is awry and the transaction is refused.

Another form of authentication data is information derived from the audio environment. A sample of ambient audio can be sensed by the smartphone microphone and processed, e.g., to classify it by type, or to decode an ambient digital watermark, or to generate an audio fingerprint. An exemplary audio fingerprint may be generated by sensing the audio over a one second interval and determining the audio power in nine linear or logarithmic bands spanning 300-3000 Hz (e.g., 300-387 Hz, 387-500 Hz, 500-646 Hz, 646-835 Hz, 835-1078 Hz, 1078-1392 Hz, 1392-1798 Hz, 1798-2323 Hz, and 2323-3000 Hz). An eight bit fingerprint is derived from this series of data. The first bit is a "1" if the first band (300-387 Hz) has more energy than the band next-above (387-500 Hz); else the first bit is a "0." And so forth up through the eighth bit (which is a "1" if the eighth band (1798-2323 Hz) has more energy than the band next-above (2323-3000 Hz).

The POS terminal can similarly sample the audio environment, and compute its own fingerprint information. This information is then compared with that communicated from the user's smartphone, and checked for correspondence. (The POS terminal can repeatedly compute an audio fingerprint for successive one second sample intervals, and check the received data against the last several computed fingerprints for a match within an error threshold, such as a Euclidean distance.)

In some implementations, the POS terminal may emit a short burst of tones—simultaneously or sequentially. The smartphone microphone senses these tones, and communicates corresponding information back to the POS terminal, where a match assessment is made. (In the case of a sequence of tones, a sequence of audio fingerprints may be communicated back.) By such arrangement, the POS terminal can influence or dictate, e.g., a fingerprint value that should reported back from the smartphone.

This is a form of challenge-response authentication. The POS terminal issues a challenge (e.g., a particular combination or sequence of tones), and the smartphone must respond with a response that varies in accordance with the challenge. The response from the smartphone is checked against that expected by the POS terminal.

Relatedly, information from the visual environment can be used as the basis for authentication data. For example, the smartphone may be held to face towards the camera of a POS terminal. A collection of colored LEDs may be positioned next to the camera of the POS terminal, and may be controlled by the POS processor to shine colored light towards the smartphone. In one transaction the POS system may illuminate a blue LED. In a next transaction it may illuminate an orange LED. The smartphone senses the color illumination from its camera (i.e., the smartphone camera on the front of the device, adjacent the display screen), and encodes this information in the artwork displayed on the phone screen. The POS terminal checks the color information reported from the smartphone (via the encoded artwork) with information about the color of LED illuminated for the transaction, to check for correspondence.

Naturally, more complex arrangements can be used, including some in which different LEDs are activated in a sequence to emit a series of colors that varies over time. This time-varying information can be reported back via the displayed artwork—either over time (e.g., the artwork displayed by the smartphone changes (steganographically) in response to each change in LED color), or the smartphone can process the sequence of different colors into a single datum. For example, the POS terminal may be capable of emitting ten different colors of light, and it issues a sequence of three of these colors—each for 100 milliseconds, in a repeating pattern. The smartphone senses the sequence, and then reports back a three digit decimal number—each digit representing one of the colors. The POS checks the received number to confirm that the three digits correspond to the three colors of illumination being presented, and that they were sensed in the correct order.

In like fashion, other time-varying authentication data can be similarly sensed by the smartphone and reported back to the cooperating system as authentication data.

All of the above types of authentication data are regarded as context data—providing information reporting context as sensed by the smartphone.

Combinations of the above-described types of authentication data—as well as others—can be used.

It will be understood that use of authentication data as described above allows the risk of a replay attack to be engineered down to virtually zero.

Not only does the authentication data serve to defeat replay attacks, it can also be used to secure the payment card information against eavesdropping (e.g., a form of "man-in-the-middle" attack). Consider a perpetrator in a grocery checkout who uses a smartphone to capture an image of a smartphone of a person ahead in line, when the latter smartphone is presenting the FIG. 4B display that includes a barcode with payment card information. The perpetrator may later hack the barcode to extract the payment card information, and use that payment card data to make fraudulent charges.

To defeat such threat, the information encoded in the displayed artwork desirably is encrypted using a key. This key can be based on the authentication data. The smartphone presenting the information can derive the key from its sensed context data (e.g., audio, imagery, pose, motion, environment, etc.), yielding a context-dependent session key. The cooperating POS system makes a parallel assessment based on its sensed context data, from which it derives a matching session key. The authentication data thus is used to create a (context-dependent) secure private channel through which information is conveyed between the smartphone and the POS system.

There are many forms of encryption that can be employed. A simple one is an exclusive-OR operation, by which bits of the message are XOR-d with bits of the key. The resulting encrypted data string is encoded in the artwork presented on the smartphone screen. The POS system recovers this encrypted data from captured imagery of the phone, and applies the same key, in the same XOR operation, to recover the bits of the original message.

More sophisticated implementations employ encryption algorithms such as DES, SHA1, MD5, etc.

Additional security can be provided by use of digital signature technology, which may be used by the POS system to provide for authentication (and non-repudiation) of the information received from the smartphone (and vice-versa, if desired).

In one such embodiment, information identifying the phone or user is conveyed from the phone to the POS system (e.g., via the encoded artwork displayed on the phone screen). This identifier can take various forms. One is the phone's IMEI (International Mobile Station Equipment Identity) data—an identifier that uniquely identifies a phone. (The IMEI can be displayed on most phones by entering *#06# on the keypad.) Another is a phone's IMSI (International Mobile Subscriber Identity) data, which identifies the phone's SIM card. Still other identifiers can be derived using known device fingerprinting techniques—based on parameter data collected from the phone, which in the aggregate distinguishes that phone from others. (All such arrangements may be regarded as a hardware ID.)

This identifier can be conveyed from the phone to the POS system in encrypted form, e.g., using context-based authentication data as described above.

Upon receipt of the identifier, the POS system consults a registry (e.g., a certificate authority) to obtain a public key (of a public-private cryptographic key pair) associated with that identifier. This enables the phone to encrypt information it wishes to securely communicate to the POS system using the phone's (or user's) private key. (This key may be stored in the phone's memory.) Information that may be encrypted in this fashion includes the payment card data. The POS system uses the public key that it obtained from the certificate authority to decrypt this information. Because the communicated information is signed with a key that allows for its decryption using the public key obtained from the certificate authority, the information is known by the POS system to have originated from the identified phone/user. (The public/private key pairs may be issued by a bank or other party involved in the transaction processing. The same party, or another, may operate the certificate authority.) Once the POS system has determined the provenance of the information provided by the mobile phone, a secondary check can be made to determine if the card information provided is associated with the phone, creating a second layer of security for a would-be attacker to surmount (beyond registering a fraudulent phone within the system, they would also have to associate the copied card information for a replay attack with the fraudulent phone).

The context based authentication data can also be encrypted with the private key, and decoded with the corresponding public key obtained from the certificate authority. In this case, since context-based authentication data is encrypted with a key that is tied to the device (e.g., via an IMEI identifier through a certificate authority), then this authentication data is logically bound to both the context and the user device.

The use of physically unclonable functions (PUFs) can also be utilized to provide confidence that the observed optical event (imager of the cooperating device) has not been spoofed. These may include but are not limited to shot-noise and temporal noise of the camera, properties of the image processing pipeline (compression artifacts, tonal curves influenced by Auto White Balance or other operations), etc. In addition, properties of the display of the mobile device can be used for this same purpose, such as dead pixels or fluctuations of display brightness as a function of time or power.

(U.S. Pat. No. 7,370,190 provides additional information about physically unclonable functions, and their uses—technology with which the artisan is presumed to be familiar.)

It will be recognized that prior art transactions with conventional credit cards, based on magnetic stripe data, offer none of the security and authentication benefits noted above. The technologies described herein reduce costs and space requirements at checkout by eliminating need for mag stripe readers or RFID terminals. While "chip card" arrangements (sometimes termed "smart cards") offer a variety of digital security techniques, they require specialized interface technology to exchange data with the chip—interface technology that has no other use. The just-described implementations, in contrast, make use of camera sensors that are commonplace in smartphones and tablets, and that are being increasingly deployed by retailers to read barcodes during checkout. This means that the marginal cost of reading is software only, in that hardware reader requirements are consistent with industry trends towards image capture at retail checkout, thereby exploiting a resource available at no marginal cost to implementers of the present technology. Notably, the reader function could be implemented in hardware as well, if doing so would provide superior cost effectiveness. The same imager-based readers could read other indicia, such as QR codes, authenticate digitally-watermarked driver licenses, and OCR relevant text.

Similarly, the system is more economical than all magnetic stripe and RFID systems because no physical cards or chips are required. (This is a particular savings when contrasted with chip card systems, due to the microprocessors and gold-plated interfaces typically used in such cards.) Nor is there any cost associated with distributing cards, confirming their safe receipt, and attending to their activation. Instead, credentials are distributed by electronically sending a file of data corresponding to a wallet card—encrypted and digitally signed by the issuing bank—to the phone, and using that file data to add the card to the smartphone wallet. The installation and activation of the card can be tied to various unique aspects of the device and/or user characteristics, such as, for example, a hardware ID or a hash of user history or personal characteristics data.

A still further advantage is that the present technology is helpful in alleviating piriformis syndrome. This syndrome involves inflammation of the sciatic nerve due to pressure in the gluteal/pelvic region. A common cause of such pressure is presence of a large wallet in a person's rear pocket, which displaces customary pelvic alignment when sitting. By removing physical cards from a user's wallet, the wallet's volume is reduced, reducing attendant compression of the sciatic nerve. Elimination of the wallet requirement also improves security and convenience of payment processing for users.

Presentation of Multiple Cards

The arrangements just-described involved presentation of a single card—a payment card. Sometimes plural cards are useful. One example is where a merchant offers discounts on certain items to users who are enrolled in the merchant's loyalty program. Another is where an airline offers a discount on checked luggage fees to fliers who are members of its frequent flier program.

In accordance with a further aspect of the technology, the UI on payment module of the user's smartphone permits selection of two or more cards from the virtual wallet. One is a payment card, and the other may be a loyalty ("merchant") card. Data corresponding to both cards may be optically conveyed to the cooperating system via the artwork presented on the display of the user's smartphone.

Figure 8:
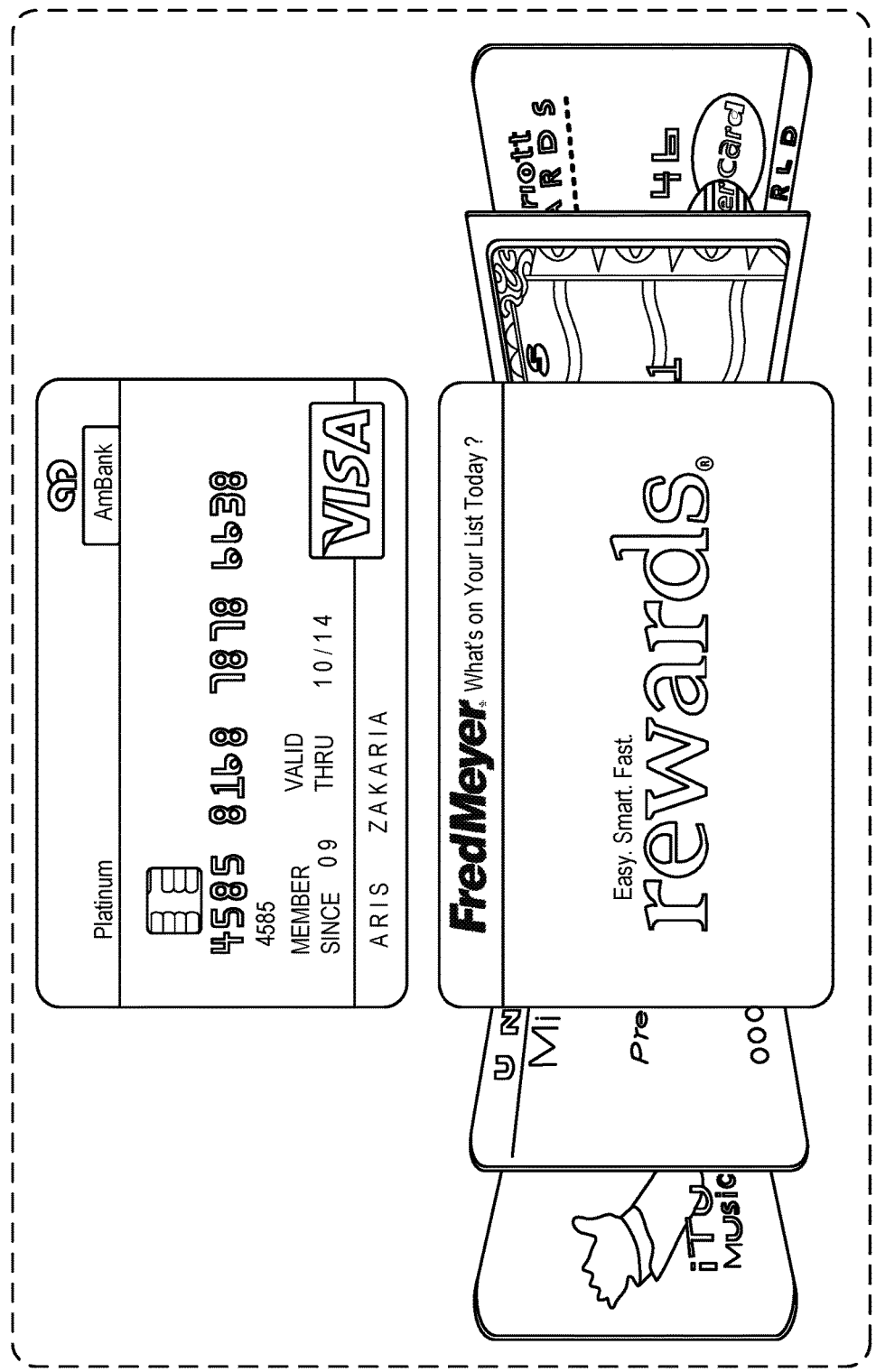
FIGS. 8 and 9 show screenshots of a user interface for selecting and presenting two cards to a vendor.
Figure 9:

FIG. 8 shows one such user interface. As before, the user flips through the deck of virtual wallet cards to find a first desired card. Instead of the user tapping the card for selection, a sweeping gesture is used to move the virtual card above the deck (as shown by the Visa card in FIG. 8), while the rest of the virtual deck slides down to make room. The user then continues flipping through the deck to locate a second card, which is selected by tapping. As a consequence of these actions, the phone screen presents artwork representing both the selected payment card, and the other (merchant) card, as shown in FIG. 9.

As before, information encoded in the displayed artwork is sensed by a camera of a cooperating system, and is used in connection with a transaction. The payment card information may be encoded in the portion of the artwork corresponding to the payment card, and likewise with the merchant card information. Or information for both cards can be encoded throughout the displayed imagery (as can the authentication information).

Figure 10A:
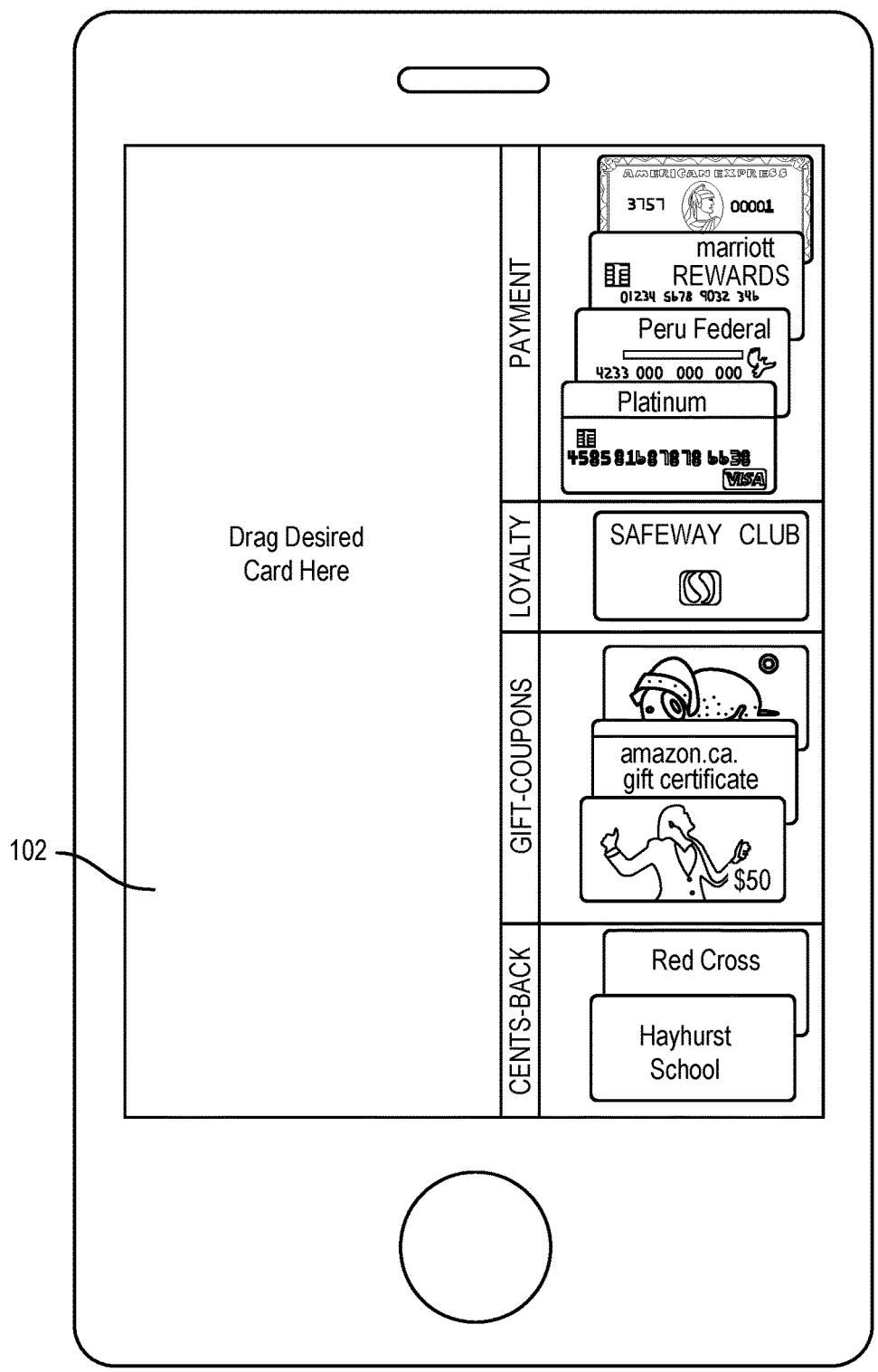
FIGS. 10A and 10B show screenshots of an alternative user interface for selecting and presenting multiple cards to a vendor.

FIG. 10A shows another style of user interface permitting selection of multiple wallet cards. Here, thumbnails of different cards are organized by type along the right edge: payment cards, loyalty cards, gift and coupon cards, and cents-back cards. (Cents-back cards serve to round-up a transaction amount to a next increment (e.g., the next dollar), with the excess funds contributed to a charity.) This right area of the depicted UI is scrollable, to reveal any thumbnails that can't be presented in the available screen space.

Desirably, the thumbnails presented on the right side of the UI are ordered so that the card(s) that are most likely to be used in a given context are the most conspicuous (e.g., not partially occluded by other cards). For example, in a Safeway store (as determined by GPS data, cross-referenced against map data identifying what businesses are at what locations; or as indicated by a sensed audio signal—such as detailed in Shopkick's patent application 20110029370), the Safeway loyalty card would be most readily available. Similarly, if a shopper historically tends to use a Visa card at the Safeway store (perhaps because the issuing bank issues triple miles for dollars spent at grocery stores), then the Visa card thumbnail would be positioned at a preferred location relative to the other payment card options. Forward chaining of inference can be used to predict which cards are most likely to be used in different situations.

Figure 10B:
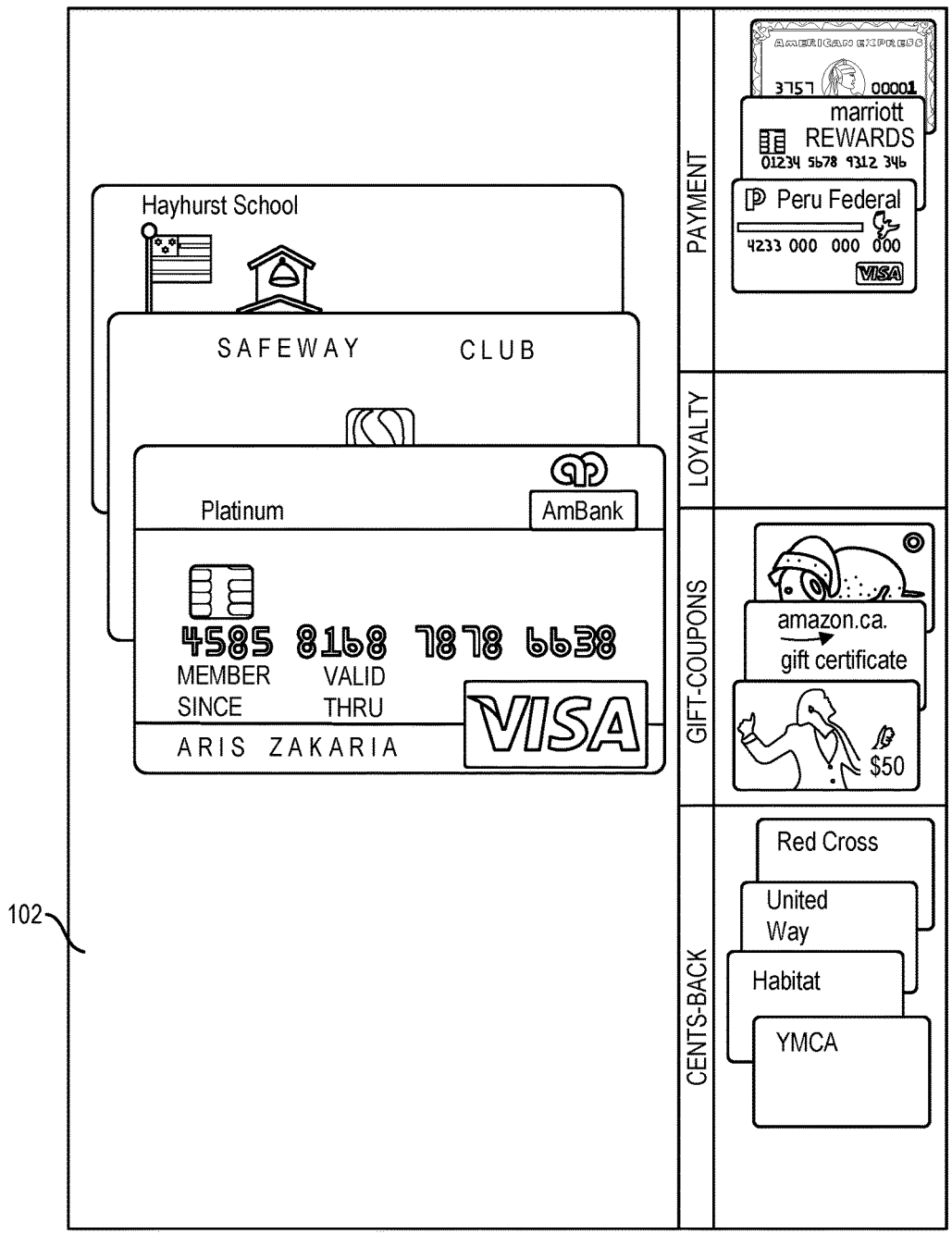

To use this form of interface, the user slides thumbnails of selected cards towards the center of the screen where they expand and stack, as shown in FIG. 10B. The user may assemble a recipe of cards including a credit card, a pair of coupon cards, a gift card, a loyalty card, and a cents-back card, while the grocery clerk is scanning items. Once the desired deck of cards is assembled, the deck is single-tapped (or in another embodiment double-tapped) to indicate that the user's selection is completed. The displayed artwork is again encoded with information, as described earlier, for optical reading by a cooperating system. As shown in FIGS. 10A and 10B, the artwork can include a background pattern 102, and this background pattern can also be encoded (thereby expanding the payload size and/or increasing the encoding robustness).

A visual indicia can be presented on the screen indicating that the artwork has been steganographically-encoded, and is ready to present for payment. For example, after the user has tapped the stack, and the artwork has been encoded, dark or other distinctive borders can appear around the card depictions.

A user interface can also be employed to split charges between two payment cards. Both cards may be in the name of the same person, or cards from two persons may be used to split a charge. (One such example is a family in which a weekly allowance is issued to teens by deposits to a prepaid debit card. A parent may have such a debit card for a teen in their smartphone wallet, and may occasionally agree to split the costs of a purchase with the teen.)

Figure 10C:
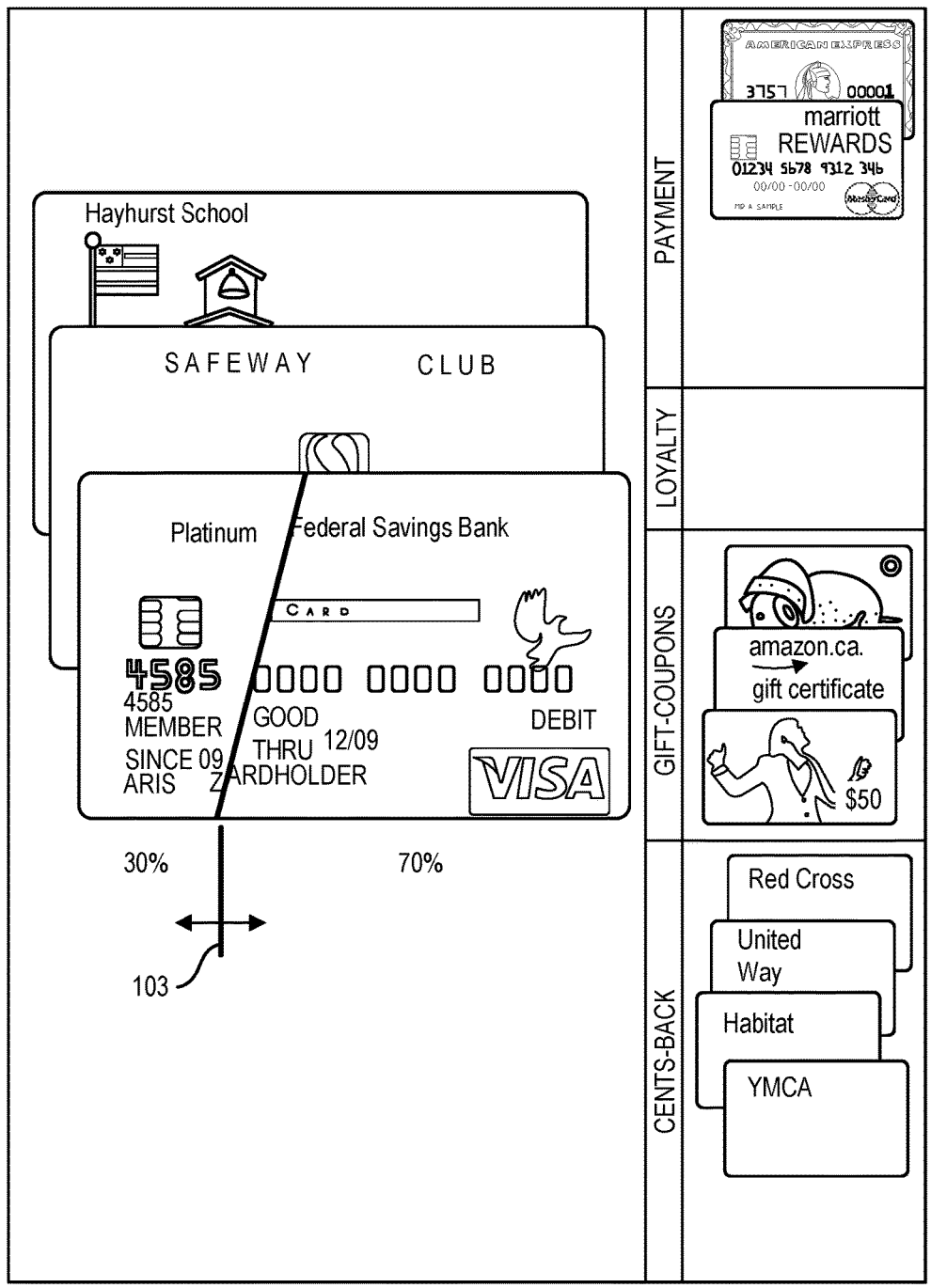
FIG. 10C illustrates how a payment can be split between two payment cards, in accordance with one aspect of the present technology.

As shown in FIG. 10C, the artwork presented in one such UI case includes a hybrid card—a graphic composed partly of artwork associated with one card, and partly of artwork associated with another card. At the junction of the two parts is a dark border, and a user interface feature 103 that can be touched by the user on the touch screen and slid right or left to apportion a charge between the two cards in a desired manner. The illustrated UI shows the split detailed in percentage (30%/70%), but a split detailed in dollars could alternatively, or additionally, be displayed.

Visual Interfaces for Wearable Computers

The visual constructs provided above can also be utilized both in a wristwatch form-factor, and for users wearing glasses.

The paradigm of card selection can leverage the inherit properties of a watch form factor to facilitate selection. One implementation may consist of the user running a finger around the bezel (device presumed to be circular for this example), to effect scrolling through the stack of cards. Simple motion of the watch may facilitate the same navigation by tilting the watch (e.g., rotation at the wrist). Payment would be facilitated the same way by showing the wearer's wrist watch to the cooperating device.

Figure 11:
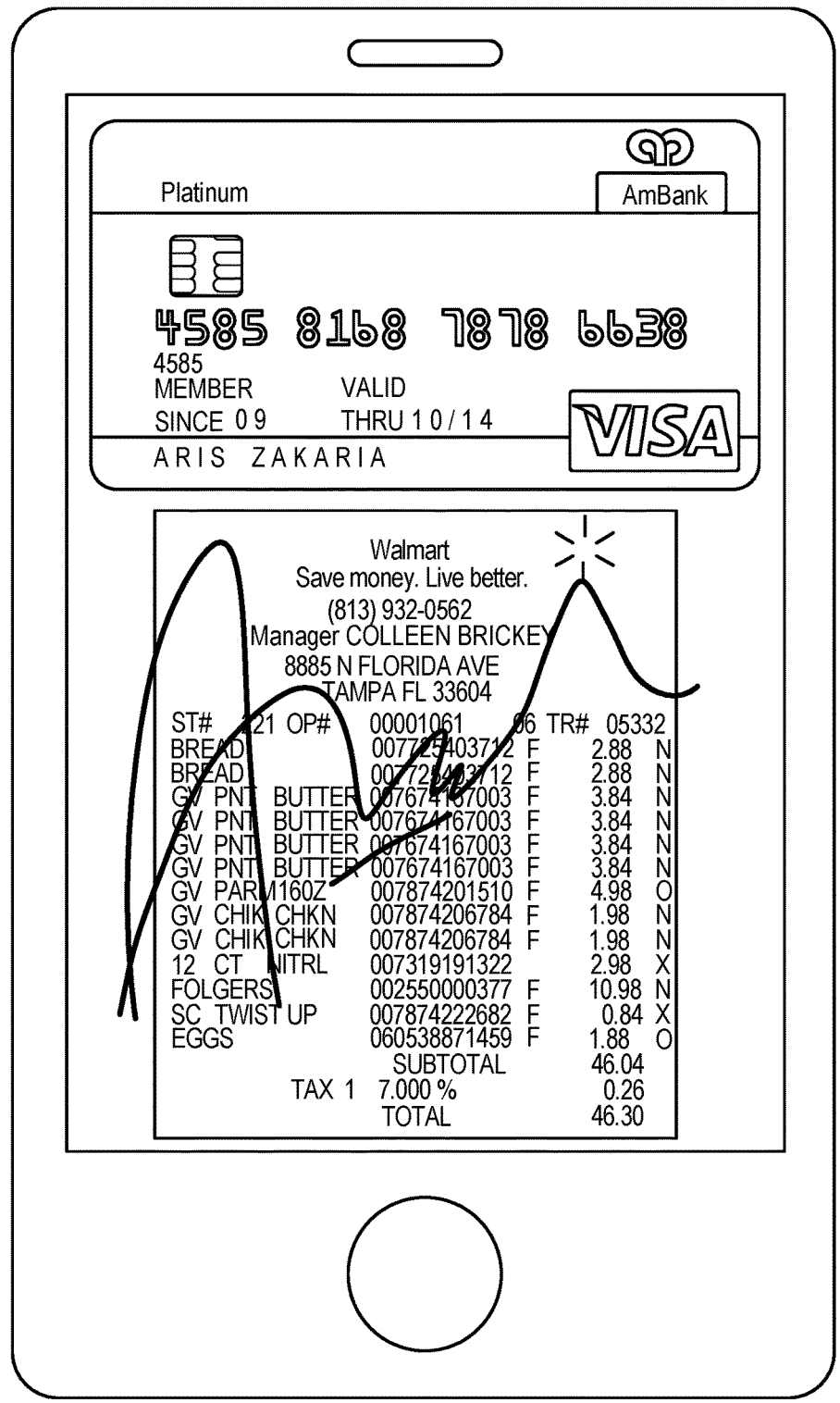
FIG. 11 shows a payment user interface that presents a tally of items for purchase together with payment card artwork, and also provides for user signature.

For users of headworn devices, such as the Google Glass product, the selection and validation process may occur through gaze tracking, blinking or any other known UI construct. Associated with the glasses would be a secondary digital device containing a display (a smartphone, a digitally connected watch such as the Pebble, or possibly a media player). The selected card would be rendered on the secondary device to complete the transaction as before. Alternatively, a portable user device can project a display, for sensing by the POS system Visual Tallies FIG. 11 shows an arrangement in which a checkout tally is presented on the user's smartphone as items are identified and priced by a point of sale terminal. In this embodiment, a user "signs" the touchscreen with a finger to signify approval.

A signature is technically not required for most payment card transactions, but there are advantages to obtaining a user's signature approving a charge. For example, some transaction networks charge lower fees if the users' express affirmance is collected. A finger-on-touchscreen signature lacks the fidelity of a pen-on-paper signature, but can still be distinctive. As part of a process of registering cards in a virtual wallet, a user's touchscreen signature can be collected. This signature, or its characterizing features, can be sent to one or more of the parties in the transaction authorization process shown in FIG. 5, who can use this initial signature data as reference information against which to judge signatures collected in subsequent transactions.

Alternatives to signatures can include finger or facial biometrics, such a thumbprint on the user's screen or capture of face using camera functions, or voiceprint, etc.

In the prior art, POS receipts detail items purchased in the order they are presented at checkout—which is perhaps the least useful order. An excerpt from such a receipt is shown in FIG. 12A. In accordance with a further aspect of the present technology, user preference information is stored in the phone and identifies the order in which items should be listed for that user.

FIG. 12B shows an alphabetical listing—permitting the user to quickly identify an item in the list. FIG. 12C shows items listed by price—with the most expensive items topping the list, so that the user can quickly see where most of the money is being spent.

FIG. 12D breaks down the purchased items by reference to stored list data. This list can be a listing of target foods that the user wants to include in a diet (e.g., foods in the Mediterranean diet), or it can be a shopping list that identifies items the user intended to purchase. The first part of the FIG. 12D tally identifies items that are purchased from the list. The second part of the tally identifies items on the list that were not purchased. (Some stores may provide "runners" who go out to the shelves to fetch an item forgotten by the shopper, so that it can be added to the purchased items before leaving the store.) The third part of the FIG. 12D tally identifies items that were purchased but not on the list (e.g., impulse purchases). Breakdown of purchased items in this fashion may help the user reduce impulse purchases.

Image-Based Authentication

An additional layer of security in mobile payment systems can make use of imagery, e.g., captured by the smartphone.

Figure 13C:
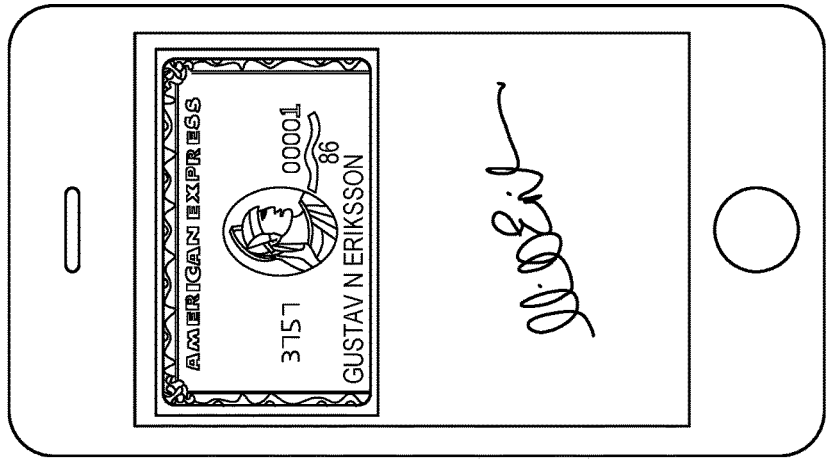
FIGS. 13A-13C show how authentication can employ steganographically-conveyed context data, an anti-phishing mutual validation system, and signature collection—all for increased security.
Figure 13B:
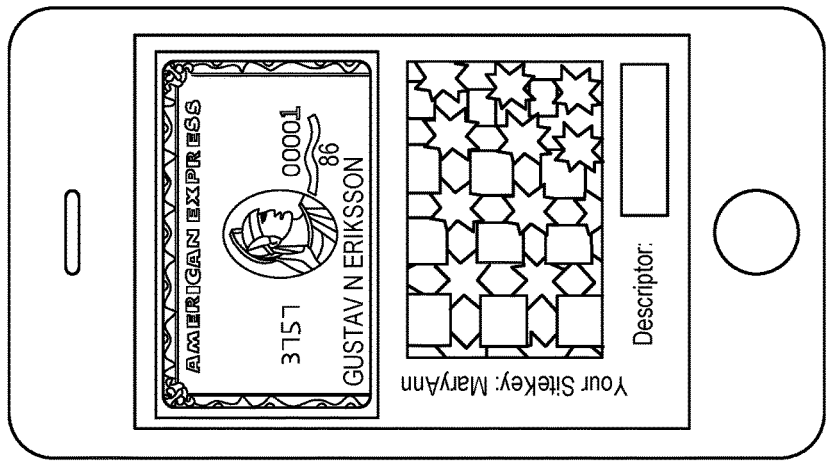
Figure 13A:
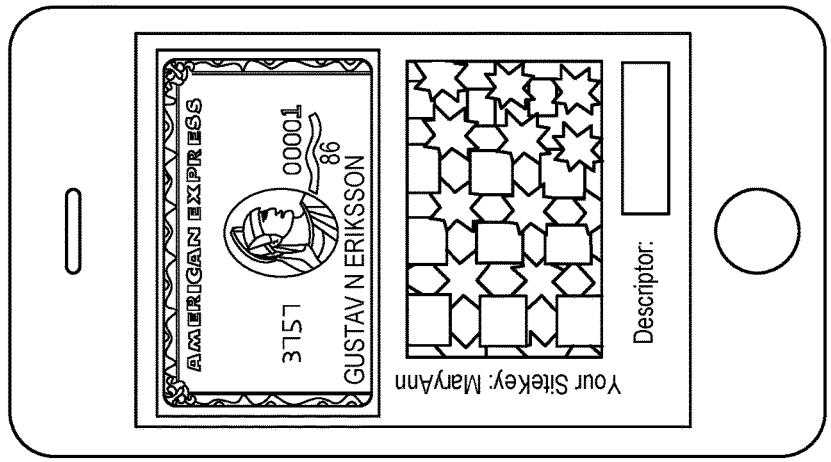

FIGS. 13A-13C illustrate one such arrangement, used to further secure an American Express card transaction. The detailed arrangement is akin to the SiteKey system, marketed by RSA Data Security.

In particular, after the user selects the American Express virtual card from the smartphone wallet, the phone sends related data to a cooperating system (which may be in data communication with American Express or RSA). Once the user/device/card is identified by such sent data, the cooperating system provides a challenge corresponding to that user/device/card for presentation on the phone screen. This challenge includes an image and a SiteKey phrase. In FIG. 13A the image is an excerpt of a quilt image, and the SiteKey is the name MaryAnn. Unlike the SiteKey system, however, the image is drawn from the user's own photo collection, stored on the smartphone that is now engaged in the authentication process. (In the present case, the user may have snapped a picture of the quilt while visiting a gift shop on vacation.) User-selection of one of the user's own images enables the user to select a SiteKey phrase that has some semantic relationship to the image (e.g., the user may have been with a friend MaryAnn when visiting the shop where the quilt was photographed).

The user verifies that the quilt image and the SiteKey word are as expected (to protect against phishing), and then is prompted to enter a Descriptor corresponding to the image. In the present case the Descriptor is the word Napa. (Again, this word may be semantically related to the displayed image and/or the SiteKey. For example, it may have been during a vacation trip to Napa, Calif., that the user and MaryAnn visited the shop where the quilt was photographed.)

A cryptographic hash of the user-entered Descriptor is computed by the smartphone, and transmitted to the cooperating system for matching against reference Descriptor data earlier stored for that user's American Express account. If they match, a message is sent to the smartphone, causing it next to solicit the user's signature, as shown in FIG. 13C.

(As in FIG. 11, the signature screen may also include a tally of the items being purchased, or other transaction summary.) After entry of the user's signature or other biometric indicia (and, optionally, checking of signature features against stored data), the transaction proceeds. In addition, or alternatively, the user's image or a user selected image may appear on the merchant's terminal screen permitting a challenge response verification of identity by the store clerk. A facial image can be manually checked and/or compared using facial biometrics algorithms.

Another challenge-response security system employs information harvested from one or more social network accounts of the user, rather than from the phone's image collection. For example, a user can be quizzed to name social network friends—information that may be protected from public inspection, but which was used in an enrollment phase. At both the enrollment phase, and in later use, the actual friends' names are not sent from the phone. Instead, hashed data is use to permit the remote system to determine whether a user response (which may be selected from among several dummy data, as above) is a correct one.

Still other information that can be used in challenge-response checks is detailed in published application 20120123959.

Figure 14:
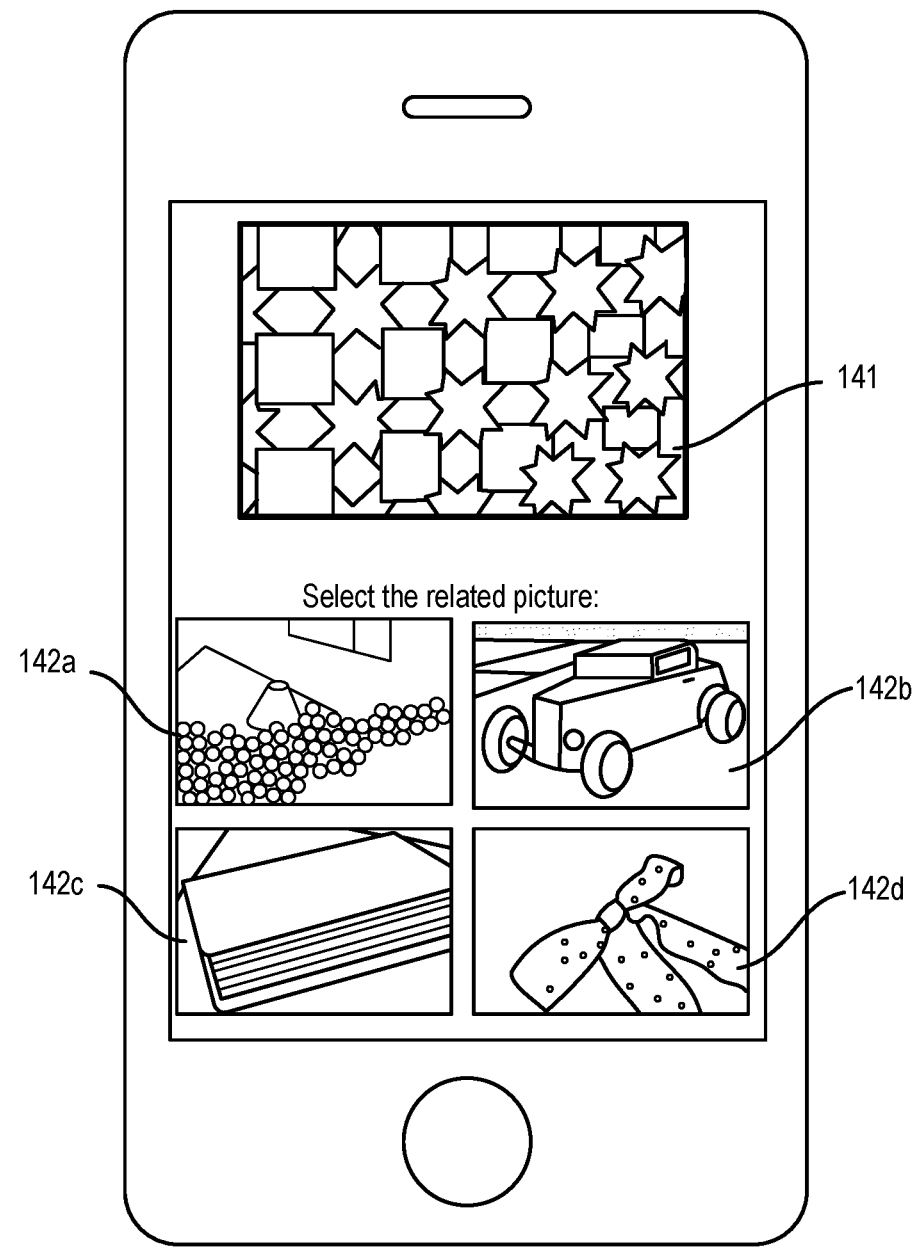

FIGS. 14 and 15 show a different authentication procedure. In this arrangement a challenge image 141 is presented, and the user is instructed to tap one of plural candidate images to identify one that is related to the challenge image. The correct, corresponding, image (142a in this case) is selected from the user's own collection of smartphone pictures (e.g., in the phone's Camera Roll data structure), as is the challenge image 141. If the user does not pick the correct candidate image from the presented array of images, the transaction is refused.

FIG. 15 details a preceding, enrollment, phase of operation, in which images are initially selected. The user is instructed to pick one image from among those stored on the phone. This user-picked image 141 is used as the reference image, and a copy of this image is sent to a cooperating system (e.g., at a bank or RSA Security). The user is next instructed to pick several other images that are related to the reference image in some fashion. (For example, all of the picked images may have been captured during a particular vacation trip.) These latter images are not sent from the phone, but instead derivative data is sent, from which these pictures cannot be viewed.

In the illustrated example, the user selects images taken during the vacation to Napa. An image of the quilt, photographed in the gift shop, is selected by the user as the reference image 141. This picture is a good choice because it does not reveal private information of the user (e.g., it does not depict any family members, and it does not reveal any location information that might be sensitive), so the user is comfortable sharing the image with an authentication service. The user then picks several other images taken during the same trip for use as related, matching images. In FIG. 15, the user-picked related images are indicated by a bold border. One shows two figures walking along a railroad track. Another shows a palm tree in front of a house. Another shows plates of food on a restaurant table. Another shows red tomatoes arrayed along a counter. All are related by common geography and time interval (i.e., a vacation to Napa).

For the user-picked related images, no copies are sent from the phone. Instead, software in the phone derives image feature information. This image feature information may comprise, e.g., an image hash, or fingerprint, or color or texture or feature histograms, or information about dominant shapes and edges (e.g., content-based image descriptors of the sort commonly used by content-based image retrieval (CBIR) systems), etc. This derived information is sent from the phone for storage at the authentication service, together with identifying information by which each such related image can be located on the user's smartphone. (E.g., file name, image date/time, check-sum, and/or image file size.)

Returning to FIG. 14, when authentication is required (e.g., after a user/device/card has been identified for a transaction), the remote system sends the reference image 141 for display on the smartphone. The remote system also sends identifying information for one of the several related images identified by the user (e.g., for the picture of the tomatoes on the counter). The remote system also sends several dummy images.

The smartphone uses the identifying information (e.g., the image name) to search for the corresponding related image in the smartphone memory. The phone next presents this image (142a), together with the dummy images received from the authentication service (142b, 142c, 142d), on the phone display. The user is then invited to pick one of the plural candidate images 142 that is related to the reference picture 141.

The user's choice is compared against the correct answer. For example, the remote system may have instructed the smartphone to present the matching image (recalled from the phone's memory, based on the identification data) in the upper left position of the array of pictures. The phone then reports to the remote system the location, in the array of candidate pictures, touched by the user. If that touch is not in the upper left position, then the remote system judges the authentication test as failed.

In other arrangements, the location of the user's tap is not reported to the remote system. Instead, the smartphone computes derived information from the image tapped by the user, and this information is sent to the remote system. The remote system compares this information with the derived information earlier received for the matching (tomatoes) image. If they do not correspond, the test is failed.

In still other arrangements, the pass/fail decision is made by the smartphone, based on its knowledge of placement of the matching image.

Although not evident from the black and white reproduction of FIG. 14, each of the candidate images 142a-142d is similar in color and structure. In particular, each of these images has a large area of red that passes through the center of the frame, angling up from the lower left. (That is, the roadster car is red, the notebook is red, and the ribbon bow is red.) This is possible because, in the illustrated embodiment, the derived information sent from the phone during the enrollment phase included color and shape parameters that characterized the matching images selected by the user. In selecting dummy images, the remote system searched for other images with similar color/shape characteristics.

This feature is important when the reference image and the matching images are thematically related. For example, if the user-selected reference and matching photos are from a camping trip and all show wilderness scenes, then a matching photo of a mountain taken by the user might be paired with dummy photos of mountains located by CBIR techniques. By such arrangement, the thematic relationship between a matching image and the reference image does not give a clue as to which of the candidate images 142 is the correct selection.

In the FIG. 14 example, the tomatoes photo was used as the matching image. The next time authentication is required, another one of the matching images earlier identified by the user can be used (e.g., the photo of a palm tree in front of a house).

It will be recognized that only the true user will be able to discern a relationship between the reference image 141, and one of the displayed candidate images 142, because only the true user knows the context that they share. Moreover, this authentication technique relies on images captured by the user, rather than "canned" imagery, as employed in the prior art.

Card Standards, Etc.

Conventional magstripe credit cards conform to ISO standards 7810, 7811 and 7813, which define the physical and data standards for such cards. Typically, the data on the magstripe includes an account number, an owner name, a country code, and a card expiration date.

"Chip cards" include a chip—typically including a processor and a memory. The memory stores the just-listed information, but in encrypted form. The card employs a variety of common digital security techniques to deter attack, including encryption, challenge-response protocols, digital signatures, etc. Entry of a user's PIN is required for most transactions. Again, an ISO standard (7816) particularly defines the card requirements, and a widely used implementation follows the EMV (EuroPay/MasterCard/Visa) standard. (An updated version of EMV, termed EMV Lite, is being promoted by Morpho Cards, GmbH.)

Artisans commonly speak of "static" and "dynamic" authentication methods.

"Static" authentication methods build on those known from magnetic stripe cards. In static authentication, information is conveyed uni-directionally, i.e., from the card, possibly through an intermediary (e.g., a POS system) to a testing system (e.g., a card issuer). Static techniques can employ digital signatures, public-private keys, etc. For example, the user's name may be hashed, digitally signed with a private key associated with the system (or issuer), and the results stored in a chip card for transmission to the POS system. The POS system receives this encrypted data from the card, together with the user name (in the clear). It applies the corresponding public key to decrypt the former, and compares this with a hash of the latter.

The present technology can be employed in systems using such known static authentication, without any system alterations. Moreover, the present technology affords protection against replay attacks (e.g., through context-based techniques)—a liability to which conventional static authentication techniques are susceptible.

The more sophisticated authentication technique is so-called "dynamic authentication." This involves a back-and-forth between the payment credential and the testing system, and may comprise challenge-response methods.

With chip cards, the card-side of the transaction is conducted by the chip, for which the POS terminal commonly has a two-way dedicated interface. But the smartphone screen used in embodiments of the present technology—which optically provides information to the cooperating system—cannot reciprocate and receive information from that system.

Nonetheless, the present technology is also suitable for use with dynamic authentication methods. The communication back from the system to the smartphone can be via signaling channels such as radio (NFC communication, WiFi, Zigbee, cellular) or audio. Optical signaling can also be employed, e.g., a POS terminal can be equipped with an LED of a known spectral characteristic, which it controllably operates to convey data to the phone, which may be positioned (e.g., laying on a checkout conveyor) so that the phone camera receives optical signaling from this LED.

Many chip-card dynamic authentication methods rely on key data stored securely in the chip. The same secure methods can be implemented in the smartphone. (Many Android phones already include this, to support the Google Wallet and similar technologies.) For example, the RSA secure architecture for SIM (microSD) cards or NFC chips, employing a tamper resistant Secure Element (SE) and a single wire protocol (SWP), can be used. The keys and other data stored in such arrangement can be accessed only via encrypted protocols.

In one particular implementation, the keys are accessed from the SE in the smartphone, and employed in a static authentication transaction (e.g., with information optically conveyed from the smartphone screen). The remote system may respond to the phone (e.g., by radio) with a request to engage in a dynamic authentication, in which case the smartphone processor (or the SE) can respond in the required back-and-forth manner.

In other arrangements, the key data and other secure information is stored in conventional smartphone memory—encrypted by the user's private key. A cloud resource (e.g., the card issuer) has the user's public key, permitting it to access this secure information. The POS system can delegate the parts of the transaction requiring this information to the issuing bank, based on bank-identifying information stored in the clear in the smartphone and provided to the POS system.

As noted, while chip cards are appealing in some aspects, they are disadvantageous because they often require merchants to purchase specialized reader terminals that have the physical capability to probe the small electrical contacts on the face of such cards. Moreover, from a user standpoint, the card is typically stored in an insecure container—a wallet. In the event a card is stolen, the only remaining security is a PIN number.

As is evident from the foregoing, embodiments of the present technology can employ the standards established for chip card systems and gain those associated benefits, while providing additional advantages such as cost savings (no specialized reader infrastructure required) and added security (the smartphone can provide many layers of security in addition to a PIN to address theft or loss of the phone).

The artisan implementing the present technology is presumed to be familiar with magstripe and chip card systems; the foregoing is just a brief review. Additional information is found, e.g., in the text by Rankl et al, *Smart Card Handbook*, 4*th* Ed., Wiley, 2010, and in the white paper, "Card Payments Roadmap in the United States: How Will EMV Impact the Future Payments Infrastructure?," Smart Card Alliance, Publication PC-12001, January, 2013.

CONCLUDING REMARKS

From the above description, it will be seen that embodiments of the present technology preserve the familiar ergonomics of credit card usage, while streamlining user checkout. No longer must a user interact with an unfamiliar keypad at the grocery checkout to pay with a credit card (What button on this terminal do I press? Enter? Done? The unlabeled green one?). No longer must the user key-in a phone number on such a terminal to gain loyalty shopper benefits. Additional advantages accrue to the merchant: no investment is required for specialized hardware that has utility only for payment processing. (Now a camera, which can be used for product identification and other tasks, can be re-purposed for this additional use.) And both parties benefit by the reduction in fraud afforded by the various additional security improvements of the detailed embodiments.

Having described and illustrated the principles of our inventive work with reference to illustrative examples, it will be recognized that the technology is not so limited.

For example, while the specification focused on a smartphone exchanging data with a cooperating system using optical techniques, other communication arrangements can be used. For example, radio signals (e.g., Bluetooth, Zigbee, etc.) may be exchanged between the phone and a POS system. Relatedly, NFC and RFID techniques can also be used.

In some embodiments, audio can also be used. For example, card and authentication data can be modulated on an ultrasonic carrier, and transmitted from the phone's speaker to a microphone connected to the POS terminal. The POS terminal can amplify and rectify the sensed ultrasonic signal to provide the corresponding digital data stream. Alternatively, an audible burst of tones within the human hearing range can be employed similarly.

In another audio embodiment, the data is conveyed as a watermark payload, steganographically conveyed in cover audio. Different items of cover audio can be used to convey different information. For example, if the user selects a VISA card credential, a clip of Beatles music, or a recording of a train whistle, can serve as the host audio that conveys the associated authentication/card information as a watermark payload. If the user selects a MasterCard credential, a BeeGees clip, or a recording of bird calls, can serve as the host audio. The user can select, or record, the different desired items of cover audio (e.g., identifying songs in the user's iTunes music library, or recording a spoken sentence or two), and can associate different payment credentials with different of these audio items. The user can thereby conduct an auditory check that the correct payment credential has been selected. (If the user routinely uses a Visa card at Safeway—signaled by the Beatles song clip, and one day he is surprised to hear the BeeGees song clip playing during his Safeway checkout, then he is alerted that something is amiss.)

While watermarking and barcodes have been expressly referenced, other optical communications techniques can also be used. One simply uses pattern recognition (e.g., image fingerprinting, or OCRing) to recognize a payment card by the presented artwork and, in some implementations, read the user name, account number, expiration date, etc., from the artwork.

While the detailed payment arrangements provide card data (e.g., account name and number), from the smartphone to the cooperating system (typically in encrypted form), in other embodiments, such information is not conveyed from the phone. Instead, the phone provides a data token, such as a digital identifier, which serves to identify corresponding wallet card data stored in the cloud. (A related approach is used, e.g., by Braintree's Venmo payment system, which "vaults" the credit card details in a central repository.) Known data security techniques are used to protect the exchange of information from the cloud to the retailer's POS system (or to whatever of the parties in the FIG. 5 transaction system first receives the true card details). The token is useless if intercepted from the phone, because its use cannot be authorized except by using techniques such as disclosed above (e.g., context-based authentication data, digital signatures, etc.).

Token-based systems make it easy for a user to handle loss or theft of the smartphone. With a single authenticated communication to the credentials vault, the user can disable all further use of the payment cards from the missing phone. (The authenticated user can similarly revoke the public/private key pair associated with user through the phone's hardware ID, if same is used.) After the user has obtained a replacement phone, its hardware ID is communicated to the vault, and is associated with the user's collection of payment cards. (A new public/private key pair can be issued based on the new phone's hardware ID, and registered to the user with the certificate authority.) The vault can download artwork for all of the virtual cards in the user's collection to the new phone. Thereafter, the new phone can continue use of all of the cards as before.

Desirable, in such embodiments, is for the artwork representing the wallet cards to be generic, without any personalized identification (e.g., no name or account number). By such arrangement, no personal information is conveyed in the replacement artwork downloaded to the new phone (nor is any personal information evident to a person who might gain possession of the lost/stolen original phone).

In an alternate implementation the virtual card data stored on the phone is logically-bound to the phone via the device ID, so that such data is not usable except on that phone. If the phone is lost or stolen, the issuer can be notified to revoke that card data and issue replacement data for installation on a replacement phone.

In still another embodiment, card data can be revoked remotely in a lost or stolen phone, using the iCloud Find My iPhone technology popularized by the Apple iPhone for remotely locking or wiping a phone.

While any combination of layered security techniques can be employed, one involves public-private key pairs issued to banks that issue payment cards. Among the information conveyed from the smartphone can be credit card account details (name, number, expiration data, etc.) provided to the phone by the issuing bank at time of virtual card issuance, already encrypted by the bank's private key. The POS system can have, stored in memory, the public keys for all credit card-issuing banks. The POS system can apply the different public keys until it finds one that decrypts the information conveyed from the smartphone, thereby assuring that the card credentials are issued by the corresponding bank.

In the detailed arrangements, a POS system makes a context-based assessment using information conveyed from the smartphone (e.g., optically conveyed from its display). In other embodiments, the roles can be reversed. For example, the POS terminal can convey context information to the smartphone, which makes an assessment using context information it determines itself. Some systems use both approaches, with the smartphone testing the POS terminal, and the POS terminal testing the smartphone. Only if both tests conclude satisfactorily does a transaction proceed.

Technology for steganographically encoding (and decoding) watermark data in artwork (and sound) is detailed, e.g., in Digimarc's U.S. Pat. Nos. 6,614,914, 6,590,996, 6,122,403, 20100150434 and 20110274310, as well as in pending application Ser. No. 13/750,752. Typically, forward error correction is employed to assure robust and accurate optical conveyance of data. The steganographic data-carrying payload capacity of low resolution artwork is on the order of 50-100 bits per square inch. With high resolution displays of the sort now proliferating on smartphones (e.g., the Apple Retina display), much higher data densities can reliably be achieved. Still greater data capacity can be provided by encoding static artwork with a steganographic movie of hidden data, e.g., with new information encoded every tenth of a second. Using such techniques, payloads in the thousands of bits can be steganographically conveyed.

Image fingerprinting techniques are detailed in patent publications U.S. Pat. No. 7,020,304 (Digimarc), U.S. Pat. No. 7,486,827 (Seiko-Epson), 20070253594 (Vobile), 20080317278 (Thomson), and 20020044659 (NEC). SIFT-based approaches for image recognition can also be employed (e.g., as detailed in U.S. Pat. No. 6,711,293). SURF and ORB are more recent enhancements to SIFT.

Applicant's other work that is relevant to the present technology includes that detailed in patent publications 20110212717, 20110161076, 20120284012, 20120046071, 20120214515, and in pending application Ser. No. 13/651,182, filed Oct. 12, 2012 and 61/745,501, filed Dec. 21, 2012, which issued as U.S. Pat. No. 8,868,039.

Related patent publications concerning mobile payment and imaging technologies include 20120303425, 20120024945, 20100082444, 20110119156, 20100125495, 20130085941, 20090276344, U.S. Pat. Nos. 8,423,457, 8,429,407, 8,250,660, 8,224,731, 7,508,954, and 7,191,156.

Although the detailed description focuses on use of the technology in bricks and mortar stores, the technology is equally useful in making purchases online.

For example, a user may employ a smartphone to browse the web site of an online merchant, and add items to a shopping cart. The merchant may have a dedicated app to facilitate such shopping (e.g., as eBay and Amazon do). At the time for payment, the user (or the web site, or the app) invokes the payment module software, causing one of the depicted interfaces (e.g., FIG. 1 or FIG. 10A) to be presented for user selection of the desired payment card. For example, an app may have a graphical control for selection by the user to activate the payment module. The user then flips through the available cards and taps one to complete the purchase. The payment module determines the device context from which it was invoked (e.g., the Amazon app, or a Safari browser with a Land's End shopping cart), and establishes a secure session to finalize the payment to the corresponding vendor, with the user-selected card. As in the earlier examples, various digital data protocols can be employed to secure the transaction. (In this case, optical communication with the cooperating system is not used. Instead, data is exchanged with the remote system by digital communications, e.g., using a 4G network to the internet, etc.)

While the present technology's robustness to various potential attacks was noted above, the technology also addresses one of the largest fraud channels in the existing credit card system: so-called "card not present" transactions. Many charge transactions are made without presenting a physical card to a merchant. (Consider all online purchases.) If a person knows a credit card number, together with owner name, expiration date, and code on back, they can make a charge. Much fraud results. By the present technology, in contrast, the smartphone serves as the payment credential—the same credential for both online and bricks-and-mortar merchants. For the former its data is presented digitally, and for the latter its data is presented optically—both with reliable security safeguards. As smartphones become ubiquitous, merchants may simply insist on cash if a smartphone is not used, with negligibly few bona fide sales lost as a consequence.

It will be recognized that the detailed user interfaces are illustrative only. In commercial implementation, it is expected that different forms of interface will probably be used, based on the demands and constraints of the particular application. (One alternative form of interface is one in which a virtual representation of a wallet card is dragged and dropped onto an item displayed on-screen that is to be purchased, or is dragged/dropped onto a displayed form that then auto-completes with textual particulars (cardholder name, billing address, card number, etc.) corresponding to the selected card. Such forms of interaction may be particularly favored when using desktop and laptop computers.)

While the focus of the disclosure has been on payment transactions, another use of wallet cards is in identification transactions. There is no reason why driver licenses, passports and other identification documents cannot have virtual counterparts (or replacements) that employ the technology detailed herein. Again, greatly increased security can thereby be achieved. Such virtual cards are also useful in self-service kiosks and other transactions. An example is checking into a hotel. While hotels routinely employ human staff to check-in guests, they do so not solely to be hospitable. Such human interaction also serves a security purpose—providing an exchange by which guests can be informally vetted, e.g., to confirm that their stated identity is bona fide. The present technology allows such vetting to be conducted in a far more rigorous manner. Many weary travelers would be pleased to check-in via a kiosk (presenting payment card and loyalty card credentials, and receiving a mag stripe-encoded, or RFID-based, room key in return), especially if it spared them a final delay in the day's travel, waiting for a human receptionist.

Similarly, air travel can be made more secure by authenticating travelers using the technologies detailed herein, rather than relying on document inspection by a bleary-eyed human worker at shift's end. Boarding passes can similarly be made more secure by including such documents in the virtual wallet, and authenticating their validity using the presently-detailed techniques.

In the embodiment detailed in FIGS. 14 and 15, the relationship between the images was due to common geography and a common interval of time (a vacation trip to Napa). However, the relationship can be of other sorts, such as person-centric or thing-centric. For example, the reference image may be a close-up of a pair of boots worn by a friend of the user, and the related candidate images can be face shots of that friend. (Dummy images can be face shots of strangers.)

Embodiments that presented information for user review or challenge on the smartphone screen, and/or solicited user response via the smartphone keypad or touch screen, can instead be practiced otherwise. For example, information can be presented to the user on a different display, such as on a point of sale terminal display. Or it can be posed to the user verbally, as by a checkout clerk. Similarly, the user's response can be entered on a device different than the smartphone (e.g., a keypad at a checkout terminal), or the user may simply voice a responsive answer, for capture by a POS system microphone.

The artisan will recognize that spectrum-based analysis of signals (e.g., audio signals, as used above in one authentication embodiment) can be performed by filter banks, or by transforming the signal into the Fourier domain, where it is characterized by its spectral components.

As noted, security checks can be posed to the user at various times in the process, e.g., when the phone is awakened, when the payment app starts, when a card is selected, when payment is finalized, etc. The check may seek to authenticate the user, the user device, a computer with which the device is communicating, etc. The check may be required and/or performed by software in the device, or by software in a cooperating system. In addition to PIN and password approaches, these can include checks based on user biometrics, such as voice recognition and fingerprint recognition. In one particular embodiment, whenever the payment module is launched, a screen-side camera on the user's smartphone captures an image of the user's face, and checks its features against stored reference features for the authorized user to confirm the phone is not being used by someone else. Another form of check is the user's custody of a required physical token (e.g., a particular car key), etc.

Location information (e.g., GPS, cell tower triangulation, etc.) can also be utilized to confirm placement of the associated mobile device within proximity of the cooperating device. High confidence on location can be achieved by relying on network-provided location mechanism from companies such as Locaid, that are not susceptible to application hacking on the mobile device (enabled by unlocking the device or otherwise.)

If a smartphone transaction fails, e.g., because the context information provided from the smartphone to the cooperating system does not match what is expected, or because the user fails multiple consecutive attempts to provide a proper PIN code or pass another security check, a report of the failed transaction can be sent to the authorized user or other recipient. Such a report, e.g., by email or telephone, can include the location of the phone when the transaction failed, as determined by a location-sensing module in the phone (e.g., a GPS system).

Although the focus of this disclosure has been on arrangements that make no use of plastic wallet cards, some of the technology is applicable to such cards.

For example, a plastic chip card can be equipped with one or more MEMS sensors, and these can be used to generate context-dependent session keys, which can then be used in payment transactions in the manners described above in connection with smartphones.

Moreover, plastic cards can also be useful in enrolling virtual cards in a smartphone wallet. One particular such technology employs interaction between printable conductive inks (e.g., of metal oxides), and the capacitive touch screens commonly used on smartphones and tablets. As detailed in publications by Printechnologics GmbH and others, when a card printed with a pattern of conductive ink is placed on a touch screen, the touch screen senses the pattern defined by the ink and can respond accordingly. (See, e.g., patent publications WO2012136817, WO2012117046, US20120306813, US20120125993, US20120306813 and US20110253789. Such technology is being commercialized under the Touchcode brand name.)

Loading the card into the digital wallet can involve placing the mobile wallet software in an appropriate mode (e.g., "ingest"), after optional authentication has been completed. The user then places the physical card on the smartphone display. The use of conductive inks on the card serves to identify the card to the mobile device. The user can then lift the card off the display, leaving a virtualized representation of the card on the display to be subsequently stored in the wallet, with the opportunity to add additional metadata to facilitate transactions or preferences (PIN's, priority, etc.).

Such physical item-based interaction with touch screens can also be used, e.g., during a challenge-response stage of a transaction. For example, a cooperating device may issue a challenge through the touch-screen on the mobile device as an alternative to (or in addition to) audio, image, wireless, or other challenge mechanisms. In one particular arrangement, a user places a smartphone screen-down on a reading device (similar to reading a digital boarding-pass at TSA checkpoints). The cooperating device would have a static or dynamic electrical interconnect that could be used to simulate a multi-touch events on the mobile device. By so doing, the mobile device can use the challenge (presented as a touch event) to inform the transaction and respond appropriately to the cooperating device.

While reference has been made to smartphones and POS terminals, it will be recognized that this technology finds utility with all manner of devices—both portable and fixed. Tablets, portable music players, desktop computers, laptop computers, set-top boxes, televisions, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S III phone, manufactured by Samsung, and the Motorola Droid Razr HD Maxx phone), and Windows 8 mobile phones (e.g., the Nokia Lumia 920).

Details of the Apple iPhone, including its touch interface, are provided in Apple's published patent application 20080174570.

Details of the Cover Flow fliptych interface used by Apple are provided in published patent application 20080062141.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

The processes and system components detailed in this specification may be implemented as instructions for computing devices, including general purpose processor instructions for a variety of programmable processors, including microprocessors (e.g., the Intel Atom, the ARM A5, the nVidia Tegra 4, and the Qualcomm Snapdragon), graphics processing units (GPUs, such as the nVidia Tegra APX 2600, and the Adreno 330-part of the Qualcomm Snapdragon processor), and digital signal processors (e.g., the Texas Instruments TMS320 series devices and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. In addition, libraries that allow mathematical operations to be performed on encrypted data can be utilized to minimize when and how sensitive information is stored in clear-text. Smartphones and other devices according to certain implementations of the present technology can include software modules for performing the different functions and acts.

Known browser software, communications software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of fingerprint and watermark data from content is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

(In like fashion, description of data being stored on a particular device is also exemplary; data can be stored anywhere: local device, remote device, in the cloud, distributed, etc. Thus, while an earlier embodiment employed user photographs stored in the phone, the detailed methods can similarly make use of user photographs stored in an online/cloud repository.)

Many of the sensors in smartphones are of the MEMS variety (i.e., Microelectromechanical Systems). Most of these involve tiny moving parts. Such components with moving parts may be termed motive-mechanical systems.

This specification details a variety of embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. However, implementation of all such combinations is straightforward to the artisan from the provided teachings.

Elements and teachings within the different embodiments disclosed in the present specification are also meant to be exchanged and combined.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

The present specification should be read in the context of the cited references. (The reader is presumed to be familiar with such prior work.) Those references disclose technologies and teachings that the inventors intend be incorporated into embodiments of the present technology, and into which the technologies and teachings detailed herein be incorporated.

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the invention. Rather, we claim as our invention all such modifications as may come within the scope and spirit of the following claims and equivalents thereof.

The invention claimed is:

1. A system including:
   i) a user portable device comprising a display and a processor, the processor configured for steganographically-encoding plural-bit auxiliary data within artwork, and controlling display of encoded artwork on the display, the artwork indicating a payment service and including a VISA®, MasterCard® or American Express® logo, the steganographically-encoding concealing presence of the plural-bit auxiliary data from human viewers, the steganographically-encoding changing with time, requiring capture of plural frames over time to gather imagery sufficient to completely decode the plural-bit auxiliary data; and
   ii) a checkout system comprising a camera system, a processor, and one or more memories, in which buses provide an interconnection between the camera system and the one or memories, the one or more memories containing instructions configuring the checkout system to perform acts including:
      using the camera system to capture first image data depicting a product presented for purchase by a user;
      using the camera system to capture plural frames of second image data depicting the encoded artwork from the display of the user portable device;
      decoding the steganographically-encoded plural-bit auxiliary data from the captured plural frames of second image data, in which the decoding utilizes the processor, and in which the buses provide an interconnection between the one or more memories and the processor;
      deriving context information about the user portable device by processing the second image data captured by the camera system, the deriving yielding derived context information, in which the derived context information comprises information about pose or motion of the user portable device; and
      using the decoded plural-bit auxiliary data and the derived context information in connection with authenticating a payment transaction serviced by VISA®, MasterCard® or American Express®.

2. The checkout system of claim 1 in which the first image data comprises plural frames including the plural frames of the second image data.

3. The checkout system of claim 1 in which the derived context information comprises information about pose of the user portable device.

4. The checkout system of claim 1 in which the derived context information comprises information about motion of the user portable device.

5. A method of operating a system, the system including i) a user portable device comprising a display and a processor configured for steganographically-encoding artwork, and controlling display of encoded artwork on the display, and ii) a checkout system comprising a camera system, one or more processors, and one or more memories, in which buses provide an interconnection between the camera system and the one or memories, said method comprising:
   controlling the processor on the user portable device to steganographically-encode plural-bit auxiliary data within artwork, the artwork indicating a payment service and including a VISA®, MasterCard® or American Express® logo, the steganographically-encoding concealing presence of the plural-bit auxiliary data from human viewers, the steganographically-encoding changing with time, requiring capture of plural frames over time to gather imagery sufficient to completely decode the plural-bit auxiliary data;
   controlling display of steganographically-encoded artwork on the display;
   capturing, using the camera system, first image data depicting a product presented for purchase by a user;
   capturing, using the camera system, plural frames of second image data depicting the steganographically-encoded artwork from the display of the user portable device;
   decoding the steganographically-encoded plural-bit auxiliary data from the captured plural frames of second image data, in which said decoding operates on the plural frames captured over time to completely decode the plural-bit auxiliary data, in which the decoding utilizes the one or more processors, and in which the buses provide an interconnection between the one or more memories and the one or more processors;
   deriving context information about the user portable device by processing the second image data captured by the camera system, the deriving yielding derived context information, in which the derived context information comprises information about pose or motion of the user portable device; and
   using the decoded plural-bit auxiliary data and the derived context information in connection with authenticating a payment transaction serviced by VISA®, MasterCard® or American Express®.

6. The method of claim 5 in which the first image data comprises plural frames including the plural frames of the second image data.

7. The method of claim 5 in which the derived context information comprises information about pose of the user portable device.

8. The method of claim 5 in which the derived context information comprises information about motion of the user portable device.

\* \* \* \* \*